(12) United States Patent
Mochizuki et al.

(10) Patent No.: US 12,407,058 B2
(45) Date of Patent: Sep. 2, 2025

(54) BATTERY PACKAGING MATERIAL HAVING A VALVE DEVICE

(71) Applicant: DAI NIPPON PRINTING CO., LTD., Tokyo (JP)

(72) Inventors: Youichi Mochizuki, Tokyo (JP); Atsuko Takahagi, Tokyo (JP); Rikiya Yamashita, Tokyo (JP); Miho Sasaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/590,074

(22) Filed: Feb. 28, 2024

(65) Prior Publication Data

US 2024/0204337 A1     Jun. 20, 2024

Related U.S. Application Data

(62) Division of application No. 17/059,903, filed as application No. PCT/JP2019/021167 on May 28, 2019, now Pat. No. 11,949,120.

(30) Foreign Application Priority Data

May 28, 2018    (JP) ................................ 2018-101808

(51) Int. Cl.
    *H01M 50/325*       (2021.01)
    *H01M 50/105*       (2021.01)
    (Continued)

(52) U.S. Cl.
    CPC ....... *H01M 50/325* (2021.01); *H01M 50/105* (2021.01); *H01M 50/124* (2021.01); *H01M 10/0525* (2013.01)

(58) Field of Classification Search
None
See application file for complete search history.

(56) References Cited

U.S. PATENT DOCUMENTS

| | | |
|---|---|---|
| 2009/0017365 A1 | 1/2009 | Miyahisa et al. |
| 2012/0176730 A1 | 7/2012 | Takemura et al. |
| | (Continued) | |

FOREIGN PATENT DOCUMENTS

| | | |
|---|---|---|
| CN | 103597631 A | 2/2014 |
| EP | 1898480 A1 | 3/2008 |
| | (Continued) | |

OTHER PUBLICATIONS

Machine Translation of Japanese Patent Publication JP2006079442 (Year: 2006).*

(Continued)

*Primary Examiner* — Wyatt P McConnell
(74) *Attorney, Agent, or Firm* — Oliff PLC

(57) ABSTRACT

A battery includes a battery element, housing body, and valve device. The housing body has a laminate including a base material, barrier, and heat-sealable resin layers. The valve device is in communication with the housing body inside. A joined edge portion in which the mutually facing heat-sealable resin layers are fused together is formed in a housing body peripheral edge portion. The valve device includes first and second portions. A valve mechanism reduces the housing body internal pressure if it is increased due to gas generated in the housing body is formed in the first portion. An air passage guides gas generated in the housing body toward the valve mechanism is formed in the second portion. The first portion is located on a joined edge portion edge outer side. At least a portion of the second portion is sandwiched between the heat-sealable resin layers in the joined edge portion.

2 Claims, 31 Drawing Sheets

(51) Int. Cl.
  *H01M 50/124* (2021.01)
  *H01M 10/0525* (2010.01)

(56) References Cited

U.S. PATENT DOCUMENTS

| | | |
|---|---|---|
| 2014/0120387 A1 | 5/2014 | Kinuta et al. |
| 2014/0141293 A1 | 5/2014 | Urano et al. |
| 2016/0020452 A1 | 1/2016 | Choi et al. |

FOREIGN PATENT DOCUMENTS

| | | |
|---|---|---|
| JP | 2001-283800 A | 10/2001 |
| JP | 2006-179442 A | 7/2006 |
| JP | 2008-198664 A | 8/2008 |
| JP | 2012-156489 A | 8/2012 |
| JP | 2015-156322 A | 8/2015 |
| JP | 2016-25083 A | 2/2016 |
| JP | 2016-072160 A | 5/2016 |
| JP | 2016-152231 A | 8/2016 |
| JP | 2016-195113 A | 11/2016 |
| KR | 20180039986 A | 4/2018 |
| WO | 2013/146803 A1 | 10/2013 |
| WO | 2015160134 A1 | 10/2015 |

OTHER PUBLICATIONS

Sep. 3, 2019 International Search Report issued in International Patent Application No. PCT/JP2019/021167.
Sep. 3, 2019 Written Opinion issued in International Patent Application No. PCT/JP2019/021167.
Nov. 9, 2021 Office Action issued in Japanese Patent Application No. 2018-101808.
Machine translation of JP 2006179442A, Kanai Takeshi, 2006 (Year: 2006).
May 12, 2022 Extended Search Report issued in European Patent Application No. 19812449.7.
Jul. 4, 2022 Office Action issued in Chinese Patent Application No. 201980035658.7.
Dec. 4, 2018 Office Action issued in Japanese Patent Application No. 2018-198416.
Machine translation of JP 2001283800A, Sonozaki et al, (Year: 2001).
Machine translation of KR20180039986A, Kim et al., 2018 (2018.).
Machine Translation of WO2015160134A1, Kim et al., 2015 (Year: 2015).

* cited by examiner

BATTERY PACKAGING MATERIAL HAVING A VALVE DEVICE

CROSS REFERENCE TO RELATED APPLICATION

This application is a divisional application of U.S. application Ser. No. 17/059,903, filed Nov. 30, 2020, the contents of which are incorporated herein by reference.

TECHNICAL FIELD

The present invention relates to a battery.

BACKGROUND ART

JP 2016-152231A (Patent Literature 1) discloses a lithium ion battery that includes a battery element and an enclosing bag that houses the battery element. In this lithium ion battery, a one-way exhaust valve is attached to the enclosing bag. When gas is generated in the enclosing bag as the lithium ion battery is charged or discharged, an excess of the gas is discharged from the one-way exhaust valve (see Patent Literature 1).

CITATION LIST

Patent Literature

Patent Literature 1: JP 2016-152231A

SUMMARY OF INVENTION

Technical Problem

Patent Literature 1 described above does not disclose a method for attaching the one-way exhaust valve to the enclosing bag. If the one-way exhaust valve is attached to the enclosing bag through heat sealing, a valve mechanism within the one-way exhaust valve may break due to heat and pressure that are applied thereto during the heat sealing process.

The present invention was made to solve this problem, and an object of the present invention is to provide a battery in which a valve mechanism is unlikely to break when a valve device is attached to the battery.

Solution to Problem

A battery according to the present invention includes a battery element, a housing body, and a valve device. The housing body is constituted by at least one laminate including at least a base material layer, a barrier layer, and a heat-sealable resin layer layered in that order and houses the battery element. The valve device is in communication with the inside of the housing body. The heat-sealable resin layers face each other in a peripheral edge portion of the housing body. A joined edge portion in which the mutually facing heat-sealable resin layers are fused together is formed in the peripheral edge portion of the housing body. The valve device includes a first portion and a second portion. A valve mechanism is formed in the first portion, the valve mechanism being configured to reduce an internal pressure of the housing body if the internal pressure is increased due to gas generated in the housing body. An air passage is formed in the second portion, the air passage being configured to guide gas generated in the housing body toward the valve mechanism. The first portion is located on an outer side of an outer edge of the joined edge portion. At least a portion of the second portion is sandwiched between the heat-sealable resin layers in the joined edge portion.

In this battery, the second portion of the valve device is sandwiched between the heat-sealable resin layers in the joined edge portion, but the first portion of the valve device is not sandwiched between the heat-sealable resin layers. Therefore, in this battery, a large pressure and a large amount of heat are not applied to the first portion, when compared to the second portion, when the mutually facing heat-sealable resin layers are fused. As a result, according to this battery, it is possible to keep the valve mechanism in the first portion from breaking due to pressure and heat applied when the mutually facing heat-sealable resin layers are fused.

Preferably, in a thickness direction of the battery, a length of the first portion may be longer than a length of the second portion, and a step may be formed at a boundary between the first portion and the second portion.

In this battery, the first portion is longer than the second portion at least in the thickness direction of the battery, and a step is formed at the boundary between the first portion and the second portion. Accordingly, in this battery, even if the valve device is excessively pressed toward the housing body to sandwich the second portion between the heat-sealable resin layers in a step of manufacturing the battery, the stepped portion is caught on end parts of the laminates. Therefore, according to this battery, it is possible to suppress a situation in which the first portion is sandwiched between the heat-sealable resin layers by mistake in the step of manufacturing the battery. Also, in the thickness direction of the battery described above, the difference between a length of a portion of the joined edge portion where the second portion is sandwiched and a length of a portion of the joined edge portion where the second portion is not sandwiched is small, when compared to a case where the step is not formed at the boundary between the first portion and the second portion. Accordingly, in the portion of the joined edge portion where the second portion is sandwiched, the heat-sealable resin layers are fused together without excessive heat and excessive pressure being applied to the heat-sealable resin layers. As a result, according to this battery, it is possible to suppress a reduction in sealing strength and a reduction in insulating performance, which would be caused if the heat-sealable resin layers become thin. Here, the reduction in the insulating performance refers to a phenomenon in which electricity passes between the barrier (metal) layer and an electrolytic solution as a result of a portion of the heat-sealable resin layers becoming thin or having cracks, for example.

Preferably, a length of the second portion in a width direction of the battery may be longer than a length of the second portion in a thickness direction of the battery.

In this battery, the length of the second portion in the thickness direction of the battery is short, when compared to a case where the cross-sectional shape of the second portion is a perfectly circular shape (the area is the same). That is, in the thickness direction of the battery described above, the difference between a length of a portion of the joined edge portion where the second portion is sandwiched and a length of a portion of the joined edge portion where the second portion is not sandwiched is small. Accordingly, in the portion of the joined edge portion where the second portion is sandwiched, the heat-sealable resin layers are fused together without excessive heat and excessive pressure being applied to the heat-sealable resin layers. As a result, according to this battery, it is possible to suppress a reduction in the sealing strength and a reduction in the insulating performance, which would be caused if the heat-sealable resin layers become thin.

Preferably, the second portion may include a wing-shaped extended end part that is formed so as to be thinner toward an end part thereof in a width direction of the battery.

In this battery, the length in the thickness direction of the battery smoothly changes from a portion of the joined edge portion where the second portion is not sandwiched to a portion of the joined edge portion where the second portion is sandwiched, when compared to a case where the wing-shaped extended end part is not provided in the second portion. Accordingly, an excessive force is not applied to the laminates at the boundary between a position where the second portion is sandwiched between the heat-sealable resin layers and a position where the second portion is not sandwiched between the heat-sealable resin layers. As a result, according to this battery, the heat-sealable resin layers can be appropriately fused without excessive heat and excessive pressure being applied to the heat-sealable resin layers, and therefore it is possible to suppress a reduction in the sealing strength and a reduction in the insulating performance, which would be caused if the heat-sealable resin layers become thin.

Preferably, a cross-sectional shape of the air passage may be a circular shape.

Preferably, a length of a cross section of the air passage in a width direction of the battery may be longer than a length of the cross section of the air passage in a thickness direction of the battery Preferably, the second portion may include a pillar that is formed in the air passage.

In this battery, the pillar is formed in the air passage in the second portion, and therefore the air passage is maintained even if pressure and heat are applied to the second portion sandwiched between the mutually facing heat-sealable resin layers. Therefore, according to this battery, the air passage in the second portion can be kept from breaking when the mutually facing heat-sealable resin layers are fused.

Preferably, an outer surface of the second portion may have a satin finish surface.

In this battery, the outer surface of the second portion has a satin finish surface, and accordingly, the heat-sealable resin easily melts at positions where the resin is in contact with the second portion. Therefore, according to this battery, the second portion of the valve device can be more firmly fixed to the housing body, when compared to a case where the outer surface of the second portion is smooth.

Preferably, at least one linear protrusion that extends in a circumferential direction may be formed on an outer surface of the second portion.

The linear protrusion securely comes into contact with the heat-sealable resin layers, and accordingly is easily fused with the laminates. In this battery, the linear protrusion extends in the circumferential direction on the outer surface of the second portion. Therefore, according to this battery, the heat-sealable resin layers and the second portion can be fused in the circumferential direction of the second portion. Also, in this battery, the area of contact between the outer surface of the second portion and the heat-sealable resin is large, when compared to a case where the linear protrusion is not formed on the second portion. Therefore, according to this battery, the second portion of the valve device can be relatively firmly fixed to the housing body. It is also possible to provide a plurality of linear protrusions to more firmly fix the second portion to the housing body.

Preferably, a corner of an end part of the second portion on a side opposite to the first portion is rounded in a plan view.

According to this battery, in a case where the end part on the side opposite to the first portion is located inside the housing body, for example, it is possible to reduce the possibility that the end part will damage the battery element within the housing body. According to this battery, it is also possible to reduce the possibility that the end part will damage the heat-sealable resin layer within the housing body and impair the insulating performance of the heat-sealable resin layer.

Preferably, an external shape of a cross section of the second portion with respect to which a center line of the air passage is the normal line may be a polygonal shape, and a corner of the polygonal shape may be rounded.

According to this battery, in a case where the end part of the second portion on the side opposite to the first portion is located inside the housing body, it is possible to reduce the possibility that the portion of the second portion located inside the housing body will damage the battery element within the housing body, and reduce the possibility that the portion of the second portion sandwiched between the heat-sealable resin layers will damage the heat-sealable resin layers and impair the insulating performance of the heat-sealable resin layers. Also, according to this battery, in a case where the end part of the second portion on the side opposite to the first portion is sandwiched between the heat-sealable resin layers, it is possible to reduce the possibility that the second portion will damage the heat-sealable resin layers and impair the insulating performance of the heat-sealable resin layers.

Preferably, the first portion and the second portion may be made of different materials, and the material of the first portion may have a higher melting point than the material of the second portion.

In this battery, the material of the first portion has a higher melting point than the material of the second portion, and therefore the first portion is unlikely to deform due to heat even if pressure and heat are applied to the second portion when the mutually facing heat-sealable resin layers are fused. Therefore, according to this battery, the valve mechanism in the first portion can be kept from breaking when the mutually facing heat-sealable resin layers are fused.

Preferably, a flat surface may be formed at least in a portion of an outer surface of at least one of the first portion and the second portion.

In this battery, the flat surface is formed in the outer surface of the valve device, and accordingly, the valve device is prevented from rolling over. According to this battery, the valve device does not roll over when the valve device is to be attached to the housing body, and therefore the valve device can be easily positioned.

Preferably, an adhesive member that is configured to adhere to both the second portion and the heat-sealable resin layers may be arranged between an outer peripheral surface of the second portion and the heat-sealable resin layers.

In this battery, the adhesive member that can adhere to the heat-sealable resin layers is bonded to the outer peripheral surface of the second portion. Therefore, according to this battery, a state where the housing body and the valve device are bonded can be easily maintained irrespective of the material of the second portion.

Preferably, a helium leakage amount from a secondary side to a primary side of the valve device measured in an environment at 25° C. in accordance with a method defined in "vacuum spraying method" of JIS Z2331:2006 "Method for helium leak testing" may be from $5.0 \times 10^{-11}$ Pa·m$^3$/sec to $5.0 \times 10^{-6}$ Pa·m$^3$/sec inclusive.

According to this battery, if gas is generated inside the housing body, the gas can be appropriately discharged to the outside of the housing body, and the intrusion of moisture from the external environment into the housing body can be effectively suppressed.

Preferably, a maximum distortion in a thickness direction of the housing body after gas generated in the housing body is discharged via the valve device to the outside of the housing body may be less than 30%.

According to this battery, gas is discharged via the valve device at appropriate timings, and therefore it is possible to reduce the possibility of the occurrence of a situation where large creases are formed in the housing body or the housing body largely deforms after gas is discharged via the valve device to the outside of the housing body.

Advantageous Effects of Invention

According to the present invention, it is possible to provide a battery in which a valve mechanism is unlikely to break when a valve device is attached to the battery.

DESCRIPTION OF EMBODIMENTS

Figure 1:
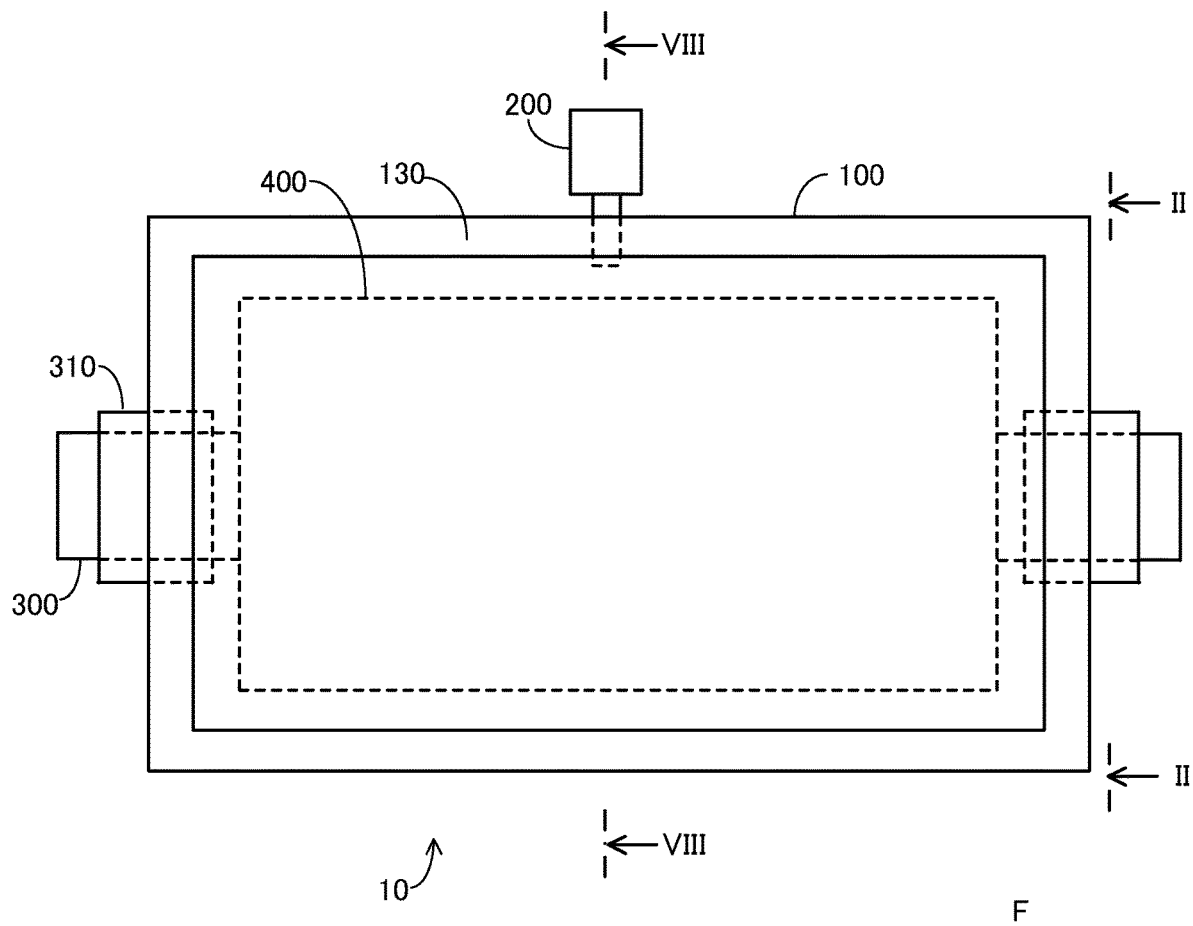
FIG. 1 is a plan view of a battery according to a first embodiment.

The following describes embodiments of the present invention in detail with reference to the drawings. Note that the same or corresponding portions are denoted with the same reference numerals in the drawings, and descriptions thereof will not be repeated.

1. First Embodiment 1-1. Overview of Battery

Figure 2:
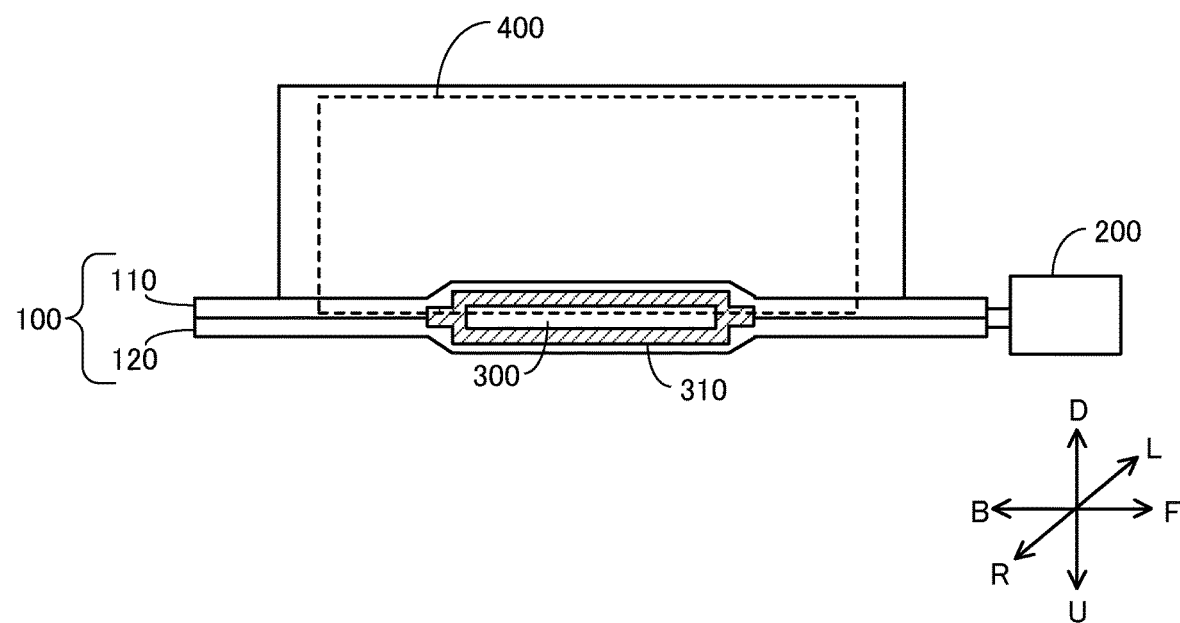
FIG. 2 is a cross-sectional view taken along line II-II in FIG. 1.

FIG. 1 is a plan view of a battery 10 according to a first embodiment. FIG. 2 is a cross-sectional view taken along line II-II in FIG. 1. In the battery 10, a positive electrode and a negative electrode of tabs 300 are arranged on opposite sides, and the battery 10 is configured to be used, for example, in an electrically driven vehicle such as an electric automobile or a hybrid automobile in which many batteries connected in series are used at a high voltage.

As shown in FIGS. 1 and 2, the battery 10 includes a housing body 100, a battery element 400, the tabs 300, tab films 310, and a valve device 200.

The housing body 100 includes packaging materials 110 and 120. The packaging materials 110 and 120 are subjected to heat sealing in a peripheral edge portion of the housing body 100 to form a joined edge portion 130. That is, the packaging materials 110 and 120 are fused together in the joined edge portion 130. Details of the packaging materials 110 and 120 will be described later.

The battery element 400 is a power storage member such as a lithium ion battery or a capacitor. The battery element 400 is housed in the housing body 100. If an abnormality occurs in the battery element 400, gas may be generated in the housing body 100. Also, if the battery element 400 is a capacitor, for example, gas may be generated in the housing body 100 due to a chemical reaction occurring in the capacitor.

The tabs 300 are metal terminals that are used to input and output power to and from the battery element 400. One end part of each tab 300 is electrically connected to an electrode (a positive electrode or a negative electrode) of the battery element 400, and the other end part protrudes from an edge of the housing body 100 to the outside.

Examples of metal materials that may constitute the tabs 300 include aluminum, nickel, and copper. If the battery element 400 is a lithium ion battery, for example, a tab 300 that is connected to the positive electrode is usually constituted by aluminum or the like, and a tab 300 that is connected to the negative electrode is usually constituted by copper, nickel, or the like.

The battery 10 includes two tabs 300. One of the tabs 300 is sandwiched between the packaging materials 110 and 120 via a tab film 310 in an end part of the housing body 100 in the direction of the arrow L. The other tab 300 is sandwiched between the packaging materials 110 and 120 via a tab film 310 in an end part of the housing body 100 in the direction of the arrow R.

The tab films 310 are adhesive protective films and are configured to adhere to both the packaging materials 110 and 120 and the tabs 300 (metal). The tabs 300 made of metal can be fixed with the packaging materials 110 and 120 as a result of the tab films 310 being interposed therebetween. Particularly, in a case where the battery is used at a high voltage, the tab films 310 preferably include a heat-resistant layer or a heat-resistant component and have a function of preventing short circuits.

The valve device 200 is in communication with the inside of the housing body 100 and is configured to discharge gas from the inside to the outside of the housing body 100 if the internal pressure of the housing body 100 has reached or exceeded a predetermined value due to gas generated in the housing body 100. A housing of the valve device 200 is preferably made of a material that directly adheres to innermost layers of the packaging materials 110 and 120, and is preferably made of a heat-sealable resin, such as polypropylene (PP), that is the same as the innermost layers of the packaging materials 110 and 120. In a case where a material other than PP is used for reasons related to heat resistance or the like, it is effective to perform sealing via a film that can adhere to both the other material and PP, similarly to the tab films used for the tabs. An end part of the valve device 200 in the direction of the arrow B is sandwiched between the packaging materials 110 and 120 in an end part of the housing body 100 in the direction of the arrow F. Details of the valve device 200 will be described later.

The battery 10 according to the first embodiment employs various structural features that are devised to attach the valve device 200 to the housing body 100. The following describes a configuration of the housing body 100, a configuration of the valve device 200, a state of the valve device 200 attached to the housing body 100, and a method for manufacturing the battery 10 in that order.

Note that the directions indicated by arrows L, R, U, D, F, and B are common to the drawings. In the following description, the direction indicated by the arrows L and R will also be referred to as a "width direction of the battery 10", and the direction indicated by the arrows U and D will also be referred to as a "thickness direction of the battery 10".

1-2. Configuration of Housing Body

Figure 3:
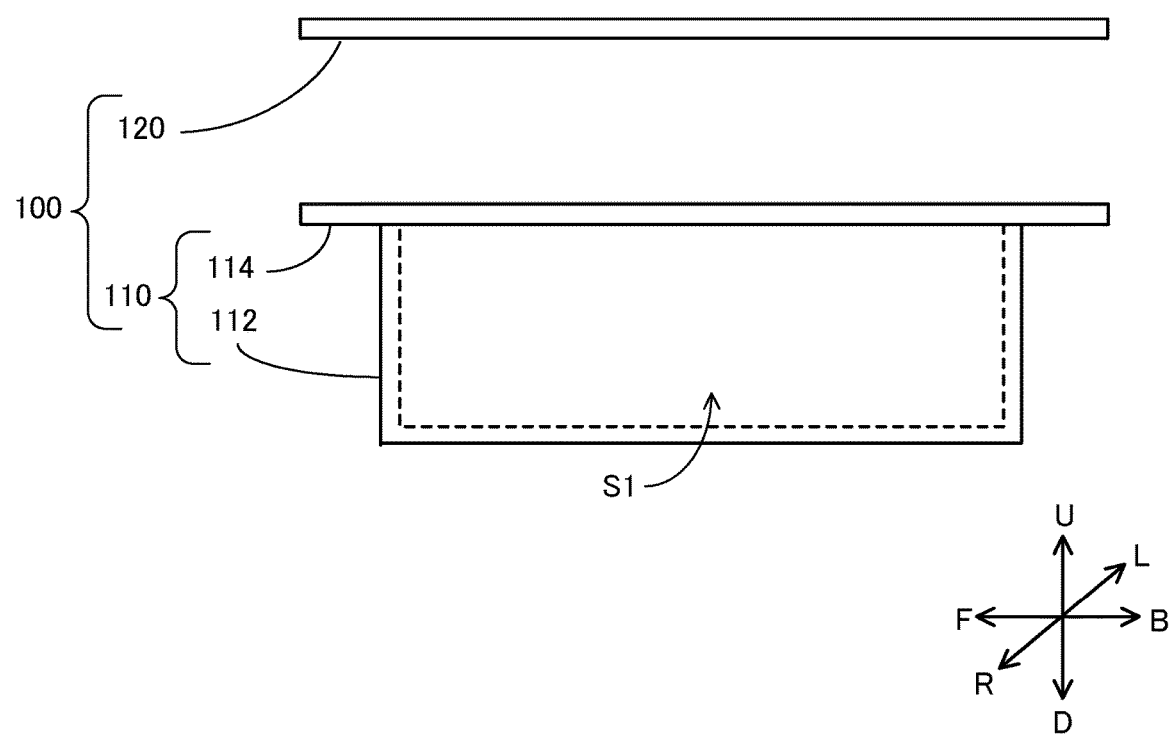
FIG. 3 is a diagram showing a housing body.

FIG. 3 is a diagram showing the housing body 100. As shown in FIG. 3, the housing body 100 includes the packaging materials 110 and 120. The packaging materials 110 and 120 are each constituted by a laminated film and have substantially the same rectangular shape in a plan view.

The packaging material 110 includes a molded part 112 that is molded so as to form a space S1 and a flange portion 114 that extends in the direction indicated by the arrows F and B and the direction indicated by the arrows L and R from the molded part 112. The molded part 112 is open in a surface in the direction of the arrow U. The battery element 400 (FIG. 1) is placed into the space S1 via the opening in the surface.

Figure 4:
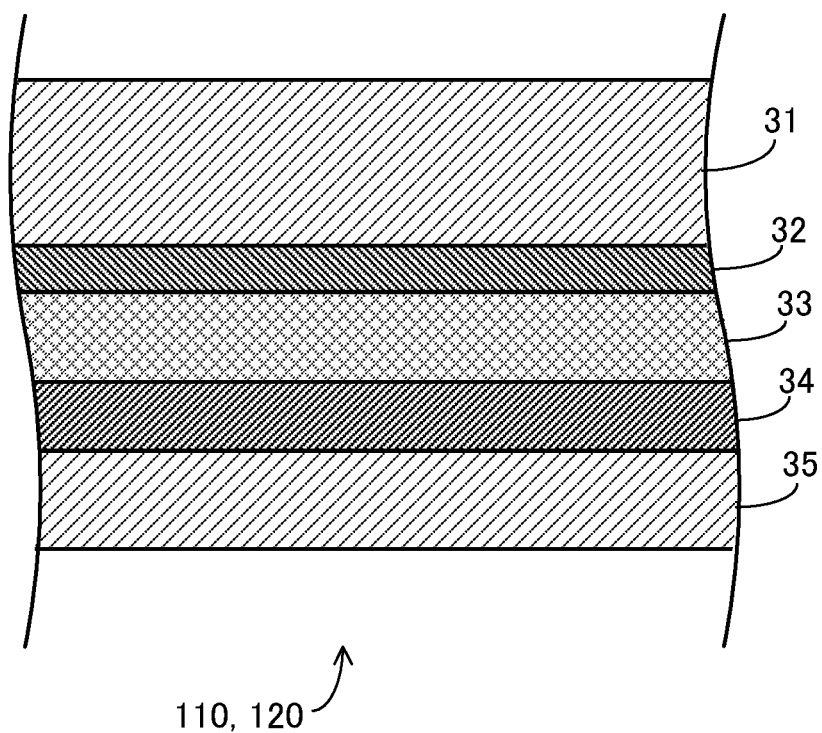
FIG. 4 is a diagram showing an example of a cross-sectional structure of packaging materials.

FIG. 4 is a diagram showing an example of a cross-sectional structure of the packaging materials 110 and 120. As shown in FIG. 4, each of the packaging materials 110 and 120 is a laminate constituted by a base material layer 31, an adhesive agent layer 32, a barrier layer 33, an adhesive layer 34, and a heat-sealable resin layer 35 that are layered in that order. Note that each of the packaging materials 110 and 120 does not necessarily have to include the layers shown in FIG. 4, and is only required to include at least the base material layer 31, the barrier layer 33, and the heat-sealable resin layer 35 layered in that order.

The base material layer 31 constitutes the outermost layer of the housing body 100, and the heat-sealable resin layer 35 constitutes the innermost layer of the housing body 100. When fabricating the battery 10, portions of the heat-sealable resin layers 35 located in peripheral edge portions of the packaging materials 110 and 120 are thermally fused together in a state where the battery element 400 (FIG. 2) is arranged in the space S1 (FIG. 3), whereby the joined edge portion 130 is formed, the battery element 400 is sealed in the housing body 100, the valve device 200 is fixed to the joined edge portion 130 through fusion, and the tabs 300 are also fixed to the joined edge portion 130 through fusion via the tab films 310. The following describes the layers included in the packaging materials 110 and 120. Note that the packaging materials 110 and 120 each have a thickness of about 50 to 200 μm, for example, and preferably about 90 to 150 μm.

1-2-1. Base Material Layer

The base material layer 31 is a layer that functions as a base material of the packaging material 110 or 120 and constitutes the outermost layer of the housing body 100.

Materials of the base material layer 31 are not specifically limited so long as the base material layer has an insulating property. Examples of materials of the base material layer 31 include polyesters, polyamides, epoxy resins, acrylic resins, fluorocarbon resins, polyurethanes, silicone resins, phenols, polyetherimides, polyimides, polycarbonates, and mixtures and copolymers thereof. The base material layer 31 may be a resin film made of any of these resins, or may be formed by applying any of these resins. The resin film may be an unstretched film or a stretched film. Examples of stretched films include a uniaxially stretched film and a biaxially stretched film, and the biaxially stretched film is preferable. Examples of stretching methods for forming the biaxially stretched film include a sequential biaxial stretching method, an inflation method, and a simultaneous biaxial stretching method. The base material layer 31 may be a single layer or may be constituted by two or more layers. In a case where the base material layer 31 is constituted by two or more layers, the base material layer 31 may be a laminate that is obtained by stacking resin films using an adhesive or the like, or a laminate that is constituted by two or more co-extruded resin films. A laminate constituted by two or more co-extruded resin films may be used as the base material layer 31 without being stretched, or may be used as the base material layer 31 after being subjected to uniaxial stretching or biaxial stretching. Specific examples of laminates that may be used as the base material layer 31 and are constituted by two or more resin films include a laminate of a polyester film and a nylon film, a laminate of two or more nylon films, and a laminate of two or more polyester films, and the base material layer 31 is preferably a laminate of a stretched nylon film and a stretched polyester film, a laminate of two or more stretched nylon films, or a laminate of two or more stretched polyester films. For example, in a case where the base material layer 31 is a laminate of two or more resin films, the base material layer 31 is preferably a laminate of a polyester resin film and a polyester resin film, a laminate of a polyamide resin film and a polyamide resin film, or a laminate of a polyester resin film and a polyamide resin film, and more preferably a laminate of a polyethylene terephthalate film and a polyethylene terephthalate film, a laminate of a nylon film and a nylon film, or a laminate of a polyethylene terephthalate film and a nylon film. Also, it is preferable that a polyester resin constitutes the outermost layer of the base material layer 31.

The base material layer 31 has a thickness of about 3 to 50 μm, for example, and preferably about 10 to 35 μm.

1-2-2. Adhesive Agent Layer

The adhesive agent layer 32 is a layer that is arranged on the base material layer 31 as necessary to impart adhesiveness to the base material layer 31. That is, the adhesive agent layer 32 is provided between the base material layer 31 and the barrier layer 33 as necessary.

The adhesive agent layer 32 is formed of an adhesive that can bond the base material layer 31 and the barrier layer 33 to each other. The adhesive used to form the adhesive agent layer 32 may be a two-liquid curable adhesive or a single-liquid curable adhesive. Also, the bonding mechanism of the adhesive used to form the adhesive agent layer 32 is not specifically limited, and may be any of a chemical reaction mechanism, a solvent volatilizing mechanism, a heat melting mechanism, and a thermocompression bonding mechanism.

The adhesive agent layer 32 has a thickness of about 1 to 10 μm, for example, and preferably about 2 to 5 μm.

1-2-3. Barrier Layer

The barrier layer 33 is a layer that improves the strength of the packaging material 110 or 120 and prevents water vapor, oxygen, light, and the like from entering the battery 10. The barrier layer 33 may be constituted by a metal such as aluminum, stainless steel, or titanium, and is preferably constituted by aluminum. The barrier layer 33 can be formed from a metal foil, a vapor-deposited metal film, a vapor-deposited inorganic oxide film, a vapor-deposited carbon-containing inorganic oxide film, or a film provided with any of these vapor-deposited films, for example, and is preferably formed from a metal foil, and more preferably formed from an aluminum foil. In order to prevent the formation of creases or pinholes in the barrier layer 33 when manufacturing the packaging materials, the barrier layer is more preferably formed from a soft aluminum foil made of annealed aluminum (JIS H4160:1994 A8021H-O, JIS H4160:1994 A8079H-O, JIS H4000:2014 A8021P-O, JIS H4000:2014 A8079P-O, etc.), for example.

The thickness of the barrier layer 33 is not specifically limited so long as the barrier layer 33 functions as a barrier layer against water vapor or the like, and may be about 10 to 100 μm, for example, and preferably about 20 to 80 μm.

1-2-4. Adhesive Layer

The adhesive layer 34 is a layer that is provided between the barrier layer 33 and the heat-sealable resin layer 35 as necessary to firmly bond the heat-sealable resin layer 35.

The adhesive layer 34 is formed using an adhesive that can bond the barrier layer 33 and the heat-sealable resin layer 35 to each other. Although the composition of the adhesive used to form the adhesive layer 34 is not specifically limited, the composition is, for example, a resin composition that contains an acid-modified polyolefin. Although the acid-modified polyolefin is not specifically limited so long as it is a polyolefin modified with an acid, the acid-modified polyolefin is preferably a polyolefin grafted with an unsaturated carboxylic acid or an anhydride thereof.

The adhesive layer 34 has a thickness of about 1 to 50 μm, for example, and preferably about 2 to 40 μm.

1-2-5. Heat-Sealable Resin Layer

The heat-sealable resin layer 35 constitutes the innermost layer of the housing body 100. The battery element 400 is sealed in the housing body 100 by thermally fusing mutually facing heat-sealable resin layers 35 in the peripheral edge portion of the housing body 100. Also, insulation quality can be maintained between an electrolytic solution and a metal constituting the barrier layer as a result of the barrier layer being covered with the heat-sealable resin layer that has at least a predetermined thickness.

Although a resin component that is used for the heat-sealable resin layer 35 is not specifically limited so long as the heat-sealable resin layer 35 can be thermally fused, the resin component is a polyolefin or an acid-modified polyolefin, for example.

Examples of polyolefins include: polyethylenes such as low-density polyethylene, medium-density polyethylene, high-density polyethylene, and linear low-density polyethylene; crystalline or noncrystalline polypropylenes such as homopolypropylene, block copolymers of polypropylene (e.g., block copolymer of propylene and ethylene), and random copolymers of polypropylene (e.g., random copolymer of propylene and ethylene); and a terpolymer of ethylene, butene, and propylene. Among these polyolefins, polyethylenes and polypropylenes are preferable. Also, although the acid-modified polyolefin is not specifically limited so long as it is a polyolefin modified with an acid, the acid-modified polyolefin is preferably a polyolefin grafted with an unsaturated carboxylic acid or an anhydride thereof.

The thickness of the heat-sealable resin layer 35 is not specifically limited, but preferably 100 μm or less, more preferably about 15 to 90 μm, and further preferably about 30 to 80 μm.

1-3. Configuration of Valve Device

Figure 5:
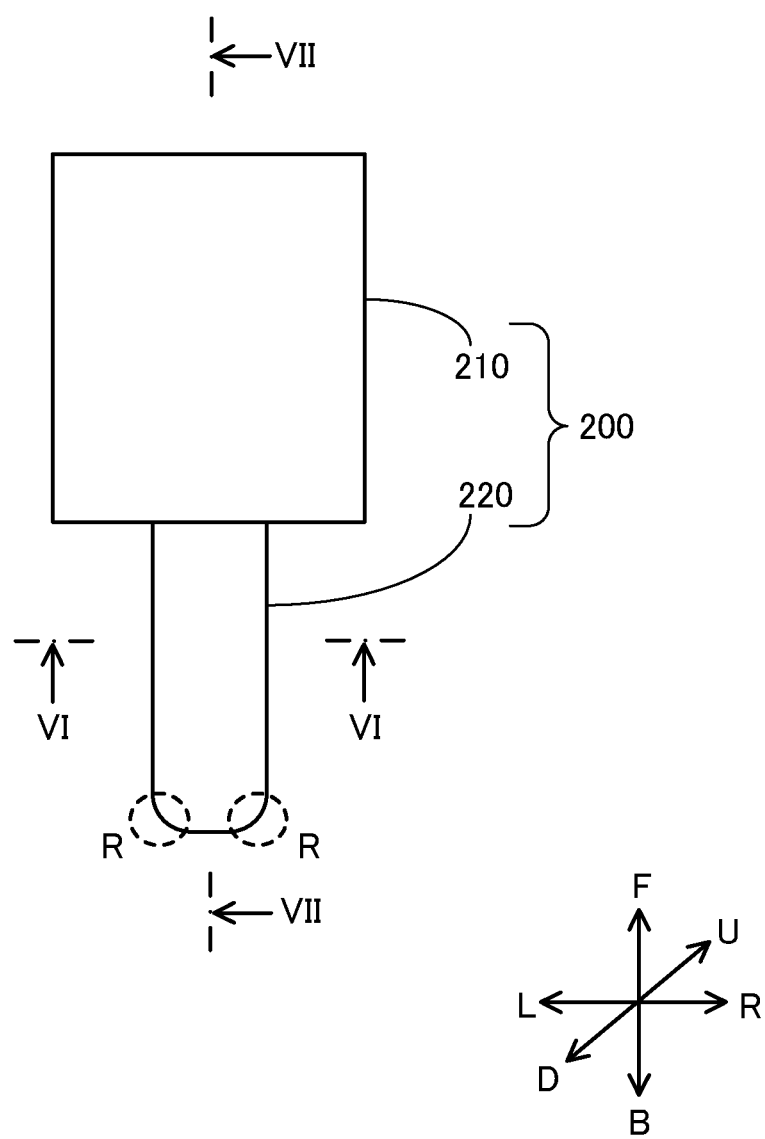
FIG. 5 is a plan view of a valve device according to the first embodiment.

FIG. 5 is a plan view of the valve device 200. As shown in FIG. 5, the valve device 200 includes a valve function portion 210 and a seal attachment portion 220. Although details will be described later, at least a portion of the seal attachment portion 220 is fixed in a state of being sandwiched between the packaging materials 110 and 120 (FIG. 2), and an outer peripheral surface of the seal attachment portion 220 and the heat-sealable resin layers 35, which are the innermost layers of the packaging materials 110 and 120, are joined as a result of being fused through heat sealing.

Rs are formed at corners of an end part of the seal attachment portion 220 in the direction of the arrow B. That is, Rs (e.g., R=0.2 mm to 2.0 mm) are formed at corners of an end part of the seal attachment portion 220 on the side opposite to the valve function portion 210 in a plan view. Note that in the present specification, the expression "an R being formed" means that a corner is rounded. Here, in the description of a structure, the expression "an R being formed" means that a corner is rounded similarly to the case where the corner is chamfered, and where "R" is described alone, "R" represents the radius of curvature of the corner. Note that it is possible to chamfer sharp corners that are formed in a step of manufacturing the valve device 200 to make the corners round (form Rs), but if the housing of the valve device 200 is a resin molded article, Rs can also be formed by molding the housing so as to originally include rounded corners, without performing chamfering such as cutting.

Figure 6:
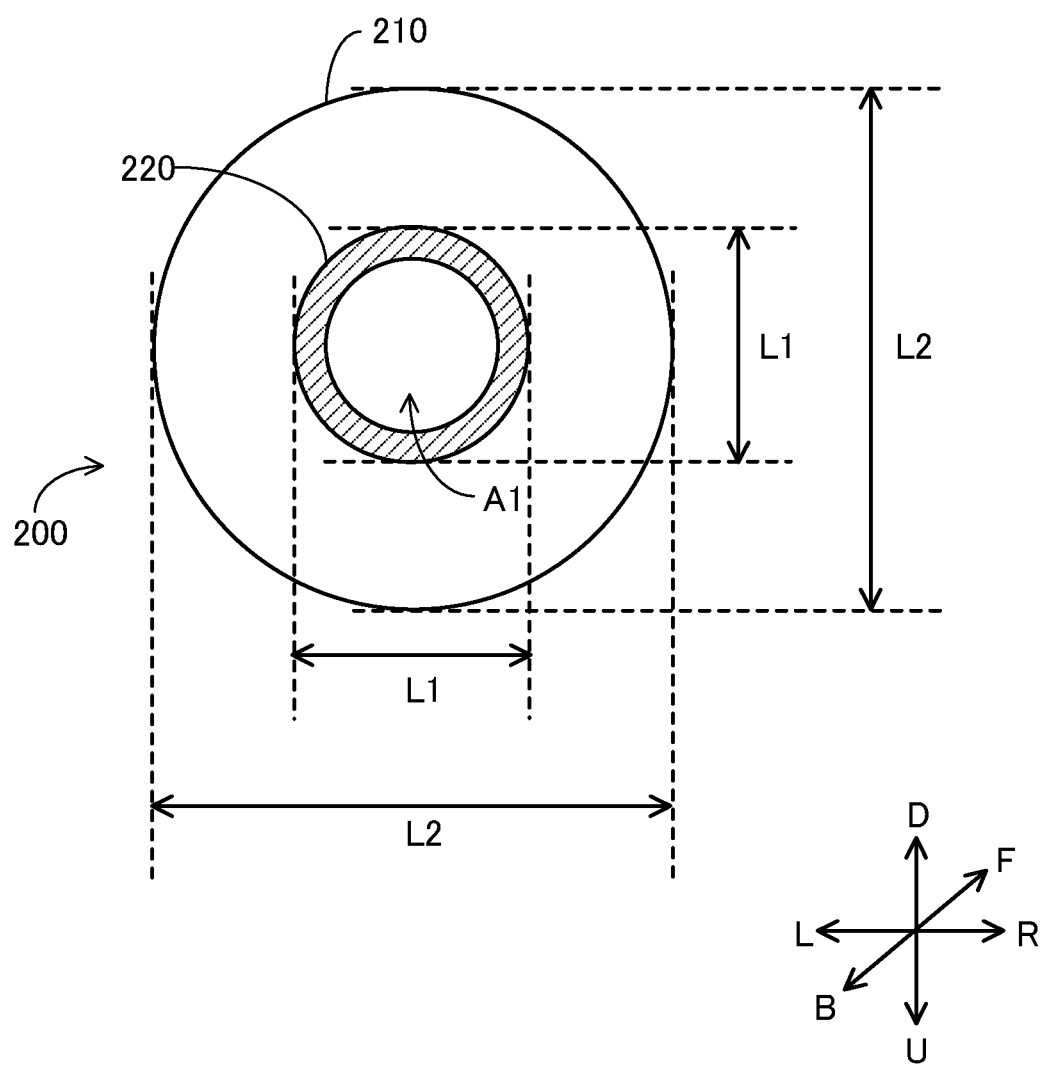
FIG. 6 is a cross-sectional view taken along line VI-VI in FIG. 5.

FIG. 6 is a cross-sectional view taken along line VI-VI in FIG. 5. As shown in FIG. 6, cross sections of the valve function portion 210 and the seal attachment portion 220 of the valve device 200 have perfectly circular shapes, and an air passage A1 is formed inside the seal attachment portion 220. A cross section of the air passage A1 has a perfectly circular shape.

In the valve device 200, a length L2 of the valve function portion 210 in the thickness direction (the direction indicated by the arrows U and D) of the battery 10 is longer than a length L1 of the seal attachment portion 220 in the thickness direction of the battery 10. A length L2 of the valve function portion 210 in the width direction (the direction indicated by the arrows L and R) of the battery 10 is longer than a length L1 of the seal attachment portion 220 in the width direction of the battery 10. That is, the diameter of the cross section of the valve function portion 210 is longer than the diameter of the cross section of the seal attachment portion 220. As a result, a step is formed at the boundary between the valve function portion 210 and the seal attachment portion 220 (FIG. 5).

Figure 7:
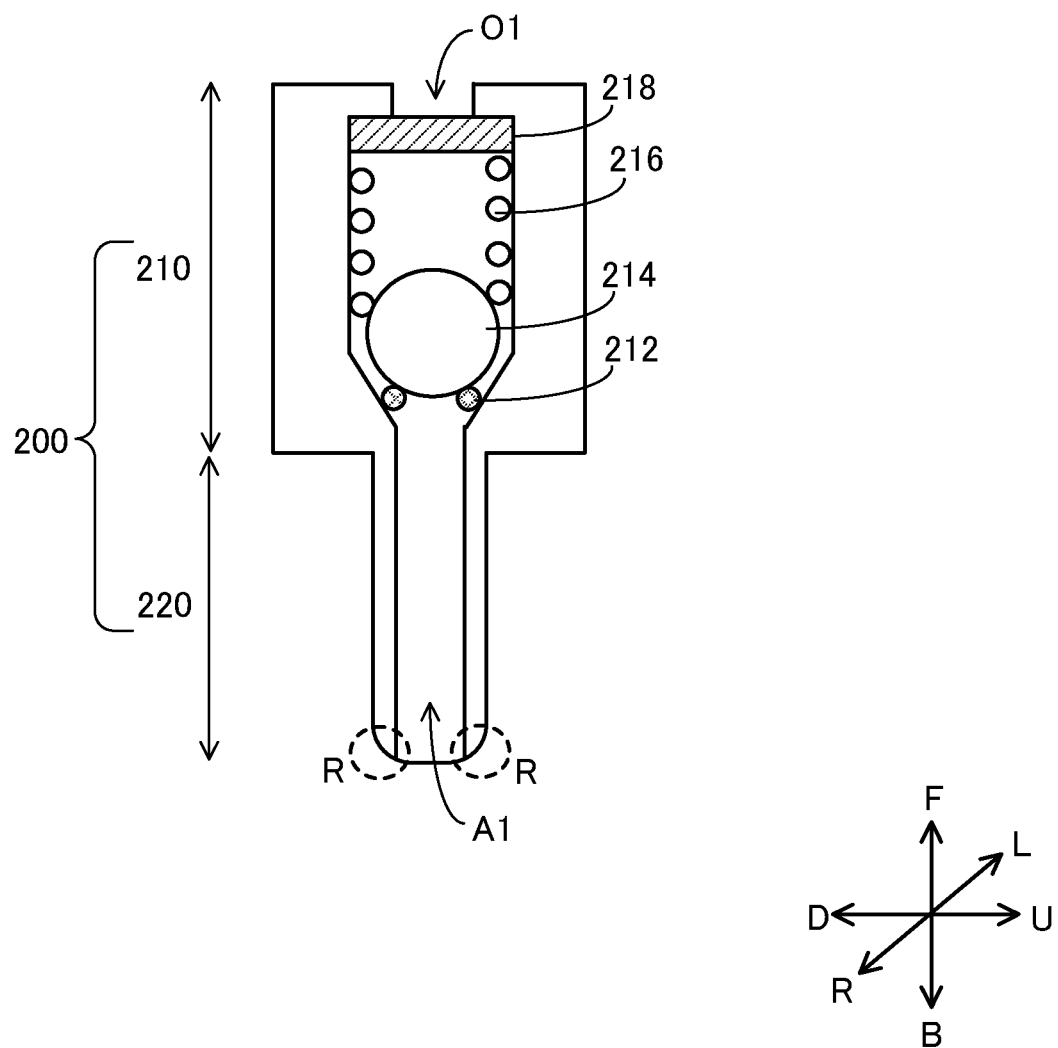
FIG. 7 is a cross-sectional view taken along line VII-VII in FIG. 5.

FIG. 7 is a cross-sectional view taken along line VII-VII in FIG. 5. As shown in FIG. 7, Rs (e.g., R=0.2 mm to 2.0 mm) are formed in the end part of the seal attachment portion 220 in the direction of the arrow B. Also, the air passage A1 is formed inside the seal attachment portion 220. The air passage A1 guides gas generated in the housing body 100 toward the valve function portion 210, for example.

A valve mechanism that is configured to discharge gas generated in the housing body 100 (FIG. 1) is provided inside the valve function portion 210. Specifically, the valve function portion 210 includes an O ring 212, a ball 214, a spring 216, and a membrane 218. That is, a ball spring valve mechanism is provided in the valve function portion 210. Note that the valve mechanism provided in the valve function portion 210 is not specifically limited so long as the mechanism can reduce the internal pressure of the housing body 100 that has been increased by gas, and may also be a poppet valve mechanism, a duckbill valve mechanism, an umbrella valve mechanism, or a diaphragm valve mechanism, for example.

The O ring 212 is a hollow circular ring and is made of fluororubber, for example. The ball 214 and the spring 216 are made of stainless steel, for example. Note that the ball 214 may also be made of resin. The membrane 218 has a pore diameter of about $10^{-2}$ to $10^0$ μm, for example, and is constituted by a PTFE membrane that keeps the electrolytic solution from leaking and allows only gas to permeate (selective permeation). Note that PTFE means polytetrafluoroethylene. Since the PTFE membrane is a soft material, if the strength of the membrane is insufficient, it is also possible to form the membrane and a mesh or a non-woven cloth of polypropylene, polyester, or the like into a single piece and use the thus reinforced membrane.

If the internal pressure of the housing body 100 reaches a predetermined pressure in a state where the valve device 200 is attached to the housing body 100, gas guided through the air passage A1 presses the ball 214 in the direction of the arrow F. As a result of the ball 214 being pressed and the spring 216 being compressed, the gas inside the housing body 100 passes through a gap that is formed between the ball 214 and the O ring 212, permeates the membrane 218, and is discharged from an exhaust port O1 to the outside of the housing body 100.

1-4. Attached State of Valve Device

Figure 8:
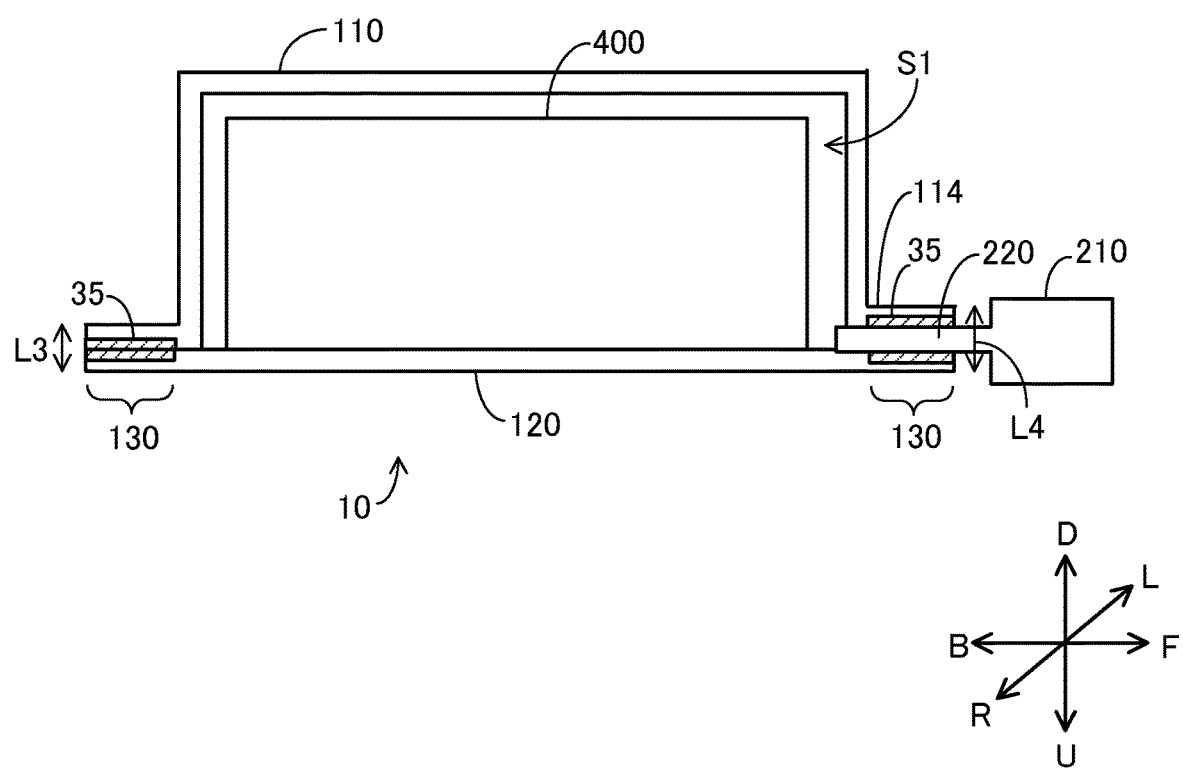
FIG. 8 is a cross-sectional view taken along line VIII-VIII in FIG. 1 and shows an attached state of the valve device.

FIG. 8 is a cross-sectional view taken along line VIII-VIII in FIG. 1 and shows an attached state of the valve device 200. As shown in FIG. 8, the valve function portion 210 of the valve device 200 is located on an outer side of an edge of the joined edge portion 130. On the other hand, a portion of the seal attachment portion 220 of the valve device 200 is sandwiched between the heat-sealable resin layer 35 of the packaging material 110 and the heat-sealable resin layer 35 of the packaging material 120 in the joined edge portion 130, and the outer peripheral surface of the seal attachment portion 220 and the heat-sealable resin layers 35 constituting the innermost layers of the packaging materials 110 and 120 are joined through fusion. Note that for the sake of convenience, FIG. 8 partially shows the heat-sealable resin layers 35 only in the vicinity of the joined edge portion 130 to show the state where the valve device 200 is joined through fusion with the heat-sealable resin layers 35, which are the innermost layers of the packaging materials 110 and 120, but the heat-sealable resin layers 35 are provided over all the surfaces of the packaging materials 110 and 120.

The following describes reasons why the seal attachment portion 220 is sandwiched between the heat-sealable resin layers 35 in the joined edge portion 130 and the valve function portion 210 is not sandwiched between the heat-sealable resin layers 35 in the joined edge portion 130 in the battery 10 according to the first embodiment.

Assume that the valve function portion 210 is sandwiched between the heat-sealable resin layers 35 in the joined edge portion 130. In this case, the valve mechanism in the valve function portion 210 may break due to heat and pressure that are applied when the heat-sealable resin layers 35 are fused together (subjected to heat sealing) in the peripheral edge portions of the packaging materials 110 and 120.

In the battery 10 according to the first embodiment, the seal attachment portion 220 is sandwiched between the heat-sealable resin layers 35 in the joined edge portion 130, but the valve function portion 210 is not sandwiched between the heat-sealable resin layers 35. Therefore, in the battery 10, a large pressure and a large amount of heat are not applied to the valve function portion 210 during the heat sealing process. That is, in the battery 10, the valve function portion 210 is not sandwiched between the heat-sealable resin layers 35 to keep the valve mechanism from breaking due to pressure and heat applied during the heat sealing process.

Also, in the battery 10 according to the first embodiment, the cross section of the seal attachment portion 220 has a smaller diameter than the cross section of the valve function portion 210 as described above. Accordingly, in the thickness direction of the battery, the difference between a length L4 of a portion of the joined edge portion 130 where the seal attachment portion 220 is sandwiched and a length L3 of a portion of the joined edge portion 130 where the seal attachment portion 220 is not sandwiched is small, when compared to a case where the diameter of the cross section of the seal attachment portion 220 is larger than or equal to the diameter of the cross section of the valve function portion 210. The larger the difference is, the more pressure applied during the heat sealing process needs to be increased to join the outer peripheral surface of the seal attachment portion 220 and the heat-sealable resin layers constituting the innermost layers of the packaging materials 110 and 120 without forming a gap therebetween. As a result, pressure applied to the peripheral edge portion of the housing body 100 during the heat sealing process is increased. If the pressure is increased, the heat-sealable resin layers 35 may become thin particularly at the position where the seal attachment portion 220 is sandwiched, and also at positions where the tab films 310 and the tabs 300 are sandwiched. If the heat-sealable resin layers 35 become thin, a dielectric breakdown may occur in the battery 10.

In the battery 10 according to the first embodiment, the difference between the length L4 and the length L3 is small as described above. Accordingly, when the peripheral edge portion of the housing body 100 is sandwiched by a heat sealing apparatus, pressure and heat are appropriately applied to the heat-sealable resin layers over the entire periphery of the housing body 100. As a result, according to the battery 10, it is possible to appropriately fuse the mutually facing heat-sealable resin layers 35 and firmly fix the seal attachment portion 220 to the housing body 100 while reducing the possibility of a dielectric breakdown in the battery 10.

Also, in the battery 10 according to the first embodiment, the end part of the seal attachment portion 220 in the direction of the arrow B protrudes into the space S1 past the flange portion 114. Therefore, depending on conditions in which the battery 10 is used, the end part of the seal attachment portion 220 in the direction of the arrow B may come into contact with the battery element 400. In the battery 10 according to the first embodiment, Rs are formed in the end part of the seal attachment portion 220 in the direction of the arrow B as described above (FIG. 5). Therefore, even if the end part of the seal attachment portion 220 comes into contact with the battery element 400, the end part is unlikely to damage the battery element 400. Also, depending on conditions in which the battery 10 is used, the end part of the seal attachment portion 220 in the direction of the arrow B may come into contact with the heat-sealable resin layer 35 of the packaging material 120. In the battery 10 according to the first embodiment, Rs are formed in the end part of the seal attachment portion 220 in the direction of the arrow B as described above, and therefore, even if the end part of the seal attachment portion 220 comes into contact with the heat-sealable resin layer 35 of the packaging material 120, the end part is unlikely to damage the heat-sealable resin layer 35.

1-5. Manufacturing Method

Figure 9:
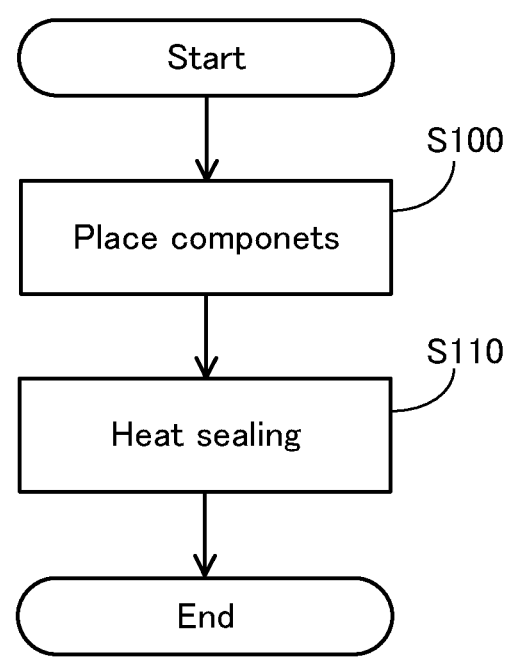
FIG. 9 is a flowchart showing a procedure for manufacturing the battery.

FIG. 9 is a flowchart showing a procedure for manufacturing the battery 10. The battery 10 is manufactured using a manufacturing apparatus, for example.

As shown in FIG. 9, the manufacturing apparatus places components in the housing body 100 (step S100). For example, the manufacturing apparatus places the battery element 400, to which the tabs 300 provided with the tab films 310 have been electrically connected through welding, into the space S1 within the packaging material 110 such that the tabs provided with the tab films 310 are placed on the flange portion 114 of the packaging material 110, and then places the valve device 200 on the flange portion 114 of the packaging material 110. Note that it is also possible to place the battery element 400 into the space S1 within the packaging material 110, then electrically connect the tabs 300 provided with the tab films 310 to the battery element 400 through welding such that the tabs and the tab films 310 are placed on the flange portion 114 of the packaging material 110, and then place the valve device 200 on the flange portion 114 of the packaging material 110. Then, the manufacturing apparatus places the packaging material 120 on the packaging material 110.

Figure 10:
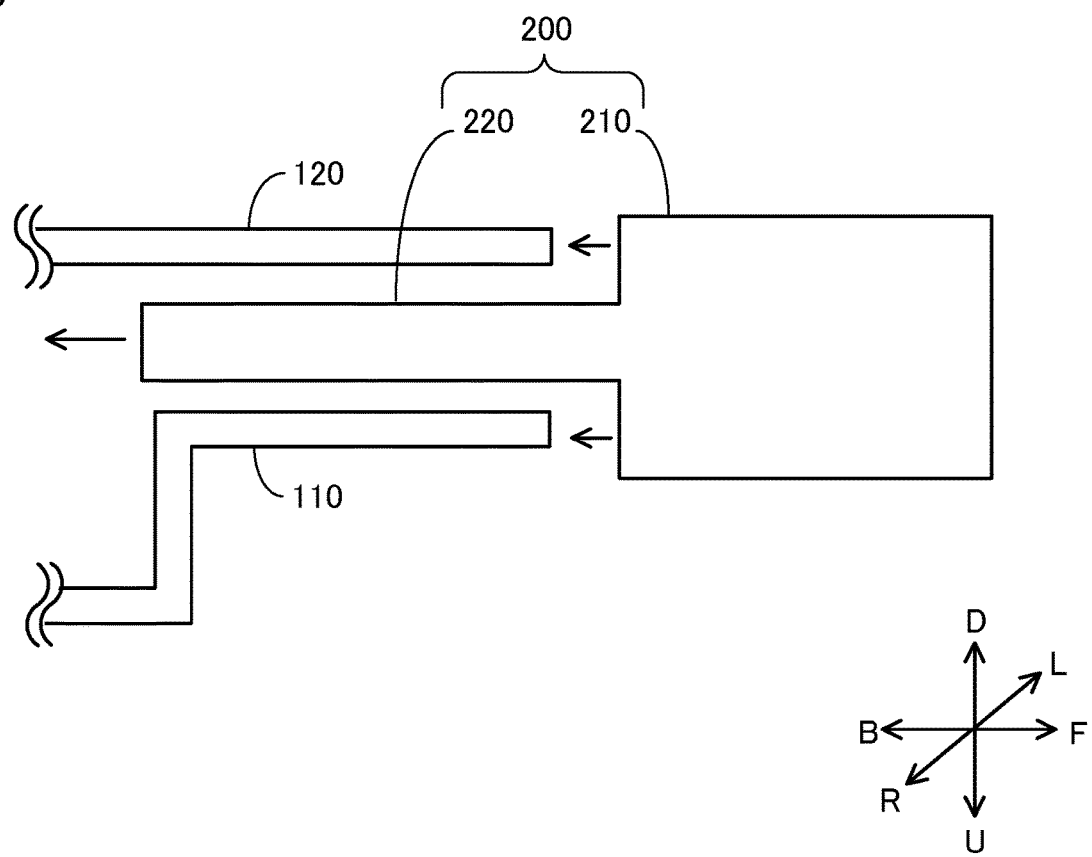
FIG. 10 is a diagram showing an operation of placing the valve device between a flange portion and a packaging material.

FIG. 10 is a diagram showing an operation of placing the valve device 200 between the flange portion 114 of the packaging material 110 and the packaging material 120. As shown in FIG. 10, a step is formed between the valve function portion 210 and the seal attachment portion 220. Accordingly, even if the valve device 200 is excessively pressed toward the housing body 100 to sandwich the seal attachment portion 220 between the packaging materials 110 and 120, the stepped portion is caught on end parts of the packaging materials 110 and 120. Therefore, according to the battery 10, it is possible to suppress a situation in which the valve function portion 210 is sandwiched between the packaging materials 110 and 120 (the heat-sealable resin layers 35) by mistake in the step of manufacturing the battery 10.

After the components are placed, the manufacturing apparatus performs heat sealing on the peripheral edge portion of the housing body 100 (step S110). That is, the manufacturing apparatus sandwiches the peripheral edge portion of the housing body 100 and applies pressure and heat to the peripheral edge portion of the housing body 100. As a result, the mutually facing heat-sealable resin layers 35 are fused together in the peripheral edge portion of the housing body 100, and the joined edge portion 130 is formed. Also, the battery element 400 is sealed in the housing body 100, the valve device 200 is fixed to the joined edge portion 130 through fusion, and the tabs 300 are also fixed to the joined edge portion 130 through fusion via the tab films 310, whereby the battery 10 is complete. Note that in the heat sealing step, gas is removed from the inside of the housing body 100 to achieve a state where unneeded gas is not contained inside the housing body 100. Specifically, a portion of the periphery of the housing body 100 is left unjoined, without the entire periphery being joined, gas is removed via the unjoined portion of the periphery, and finally pressure and heat are applied to the unjoined portion of the periphery to complete the joined edge portion 130 over the entire periphery. In the case of a battery that requires an electrolytic solution, a portion of the periphery of the housing body 100 is left unjoined, without the entire periphery being joined, the electrolytic solution is introduced via the unjoined portion of the periphery, gas is removed, and finally pressure and heat are applied to the unjoined portion of the periphery to complete the joined edge portion 130 over the entire periphery.

Also, it is effective to make surfaces of seal bars of the manufacturing apparatus that sandwich the peripheral edge portion of the housing body 100 have a shape that conforms to the external shape of the seal attachment portion 220. In this case, the heat-sealable resin layers 35 are more firmly joined together at the position where the seal attachment portion 220 is sandwiched. In this case as well, it is effective to make the seal attachment portion 220 have a flattened shape as in a second embodiment described below, in order to suppress deformation of the packaging materials 110 and 120 and a load applied thereto.

1-6. Features

As described above, in the battery 10 according to the first embodiment, at least a portion of the seal attachment portion 220 of the valve device 200 is sandwiched between the heat-sealable resin layers 35 in the joined edge portion 130, and the valve function portion 210 of the valve device 200 is not sandwiched between the heat-sealable resin layers 35 in the joined edge portion 130. Therefore, in the battery 10, a large pressure and a large amount of heat are not applied to the valve function portion 210, when compared to the seal attachment portion 220, when the mutually facing heat-sealable resin layers 35 are fused. As a result, according to the battery 10, it is possible to keep the valve mechanism in the valve function portion 210 from breaking due to pressure and heat applied when the mutually facing heat-sealable resin layers 35 are fused.

Note that the battery element 400 is an example of a "battery element" in the present invention, the housing body 100 is an example of a "housing body" in the present invention, and the valve device 200 is an example of a "valve device" in the present invention. The base material layer 31 is an example of a "base material layer" in the present invention, the barrier layer 33 is an example of a "barrier layer" in the present invention, and the heat-sealable resin layer 35 is an example of a "heat-sealable resin layer" in the present invention. The joined edge portion 130 is an example of a "joined edge portion" in the present invention. The valve function portion 210 is an example of a "first portion" in the present invention, and the seal attachment portion 220 is an example of a "second portion" in the present invention. The air passage A1 is an example of an "air passage" in the present invention.

For the sake of convenience, the size of the battery element 400 is shown as being small relative to the space S1 within the housing body 100 in order to make it easy to understand that the battery element 400 is housed in the space S1 within the housing body 100. Although the space S1 is slightly larger than the battery element 400 in order to place the battery element 400 into the space S1 in a manufacturing step, gas is removed in a manufacturing step as described above, and accordingly, the space S1 is slightly reduced as the gas is removed, and in a final state of the battery 10, the space S1 has substantially the same size as the battery element 400, and the battery element 400 is housed in the space S1 with almost no gap formed therebetween.

2. Second Embodiment

The second embodiment differs from the first embodiment described above in the configuration of the valve device. Other configurations are basically the same as those in the first embodiment. Here, differences from the first embodiment will be described.

Figure 11:
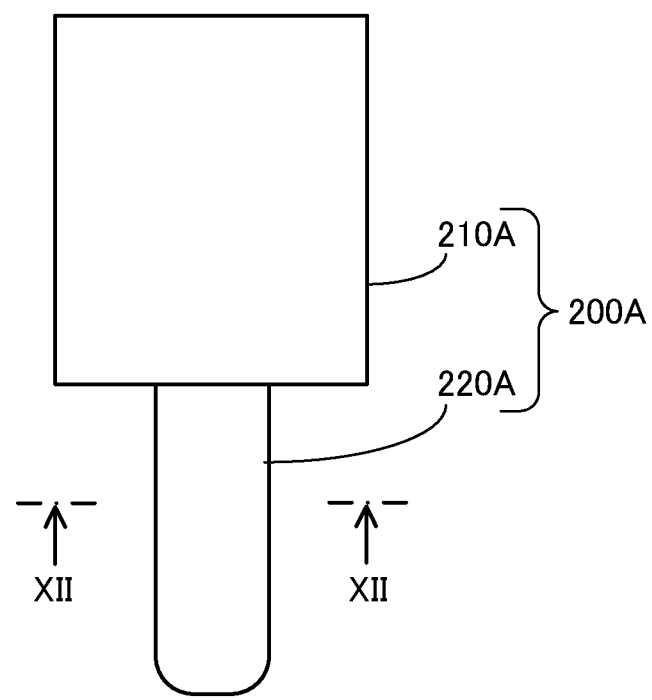
FIG. 11 is a plan view of a valve device according to a second embodiment.
Figure 11:
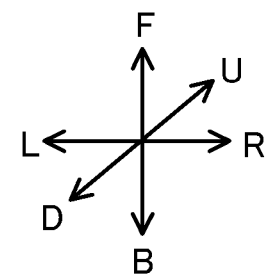

FIG. 11 is a plan view of a valve device 200A that is mounted in a battery according to the second embodiment. As shown in FIG. 11, the valve device 200A includes a valve function portion 210A and a seal attachment portion 220A. At least a portion of the seal attachment portion 220A is sandwiched between the packaging materials 110 and 120 and is subjected to heat sealing. The cross-sectional shape of the seal attachment portion 220A differs from that in the first embodiment. The valve function portion 210A is basically the same as that in the first embodiment, but the shapes of the housing and the valve mechanism are partially changed since an air passage A6 (FIG. 12) formed in the seal attachment portion 220A has a different shape.

Figure 12:
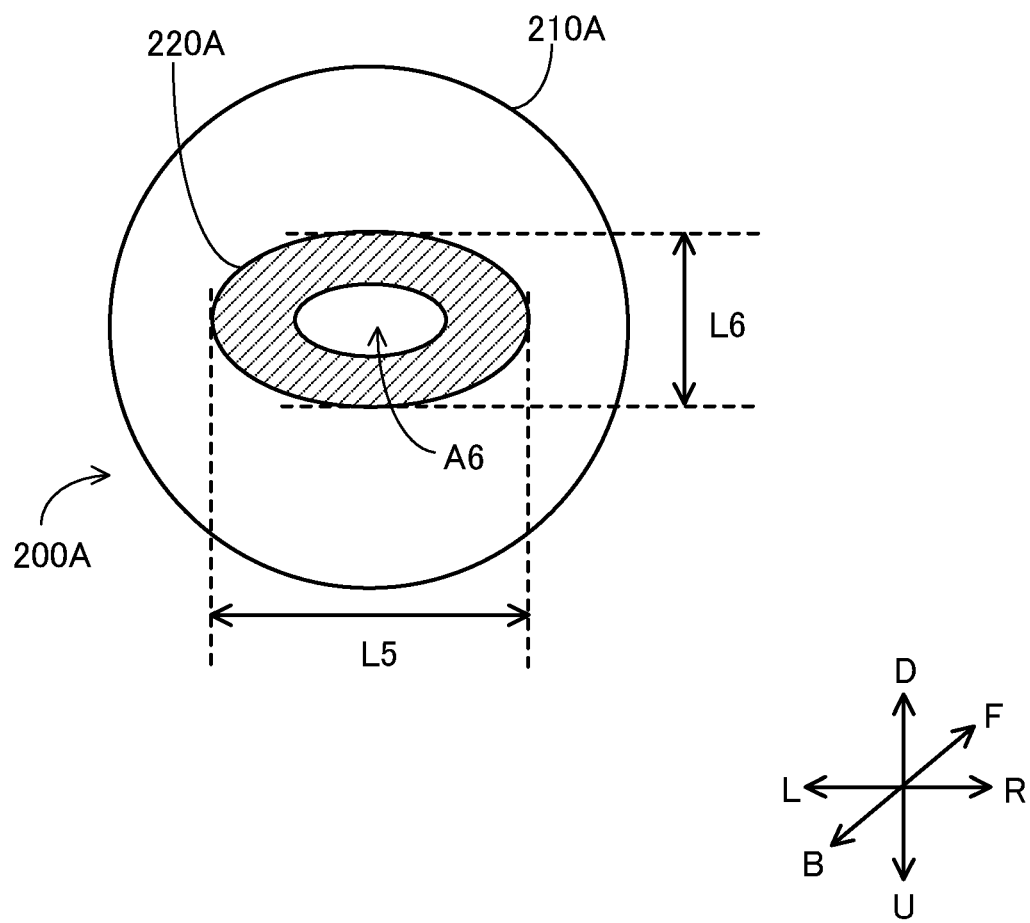
FIG. 12 is a cross-sectional view taken along line XII-XII in FIG. 11.

FIG. 12 is a cross-sectional view taken along line XII-XII in FIG. 11. As shown in FIG. 12, in a cross section of the seal attachment portion 220A, a length L5 in the width direction (the direction indicated by the arrows L and R) of the battery is longer than a length L6 in the thickness direction (the direction indicated by the arrows U and D) of the battery. More specifically, the cross-sectional shape of the seal attachment portion 220A is an elliptical shape.

The air passage A6 is formed inside the seal attachment portion 220A. The length of the air passage A6 in the width direction of the battery is longer than the length of the air passage A6 in the thickness direction of the battery. More specifically, the cross-sectional shape of the air passage A6 is an elliptical shape.

As described above, in the second embodiment, the length L5 of the cross section of the seal attachment portion 220A in the width direction of the battery is longer than the length L6 of the cross section of the seal attachment portion 220A in the thickness direction of the battery. That is, the length of the seal attachment portion 220A in the thickness direction of the battery is short, when compared to a case where the cross-sectional shape of the seal attachment portion is a perfectly circular shape (the area is the same). In the thickness direction of the battery described above, the difference between a length of a portion of the joined edge portion 130 where the seal attachment portion 220A is sandwiched and a length of a portion of the joined edge portion 130 where the seal attachment portion 220A is not sandwiched is further reduced. Therefore, according to this battery, it is possible to appropriately apply pressure and heat to the heat-sealable resin layers 35 over the entire periphery of the housing body 100 and appropriately fuse the mutually facing heat-sealable resin layers 35, and therefore the seal attachment portion 220A of the valve device 200A can be firmly fixed to the housing body 100.

Note that the valve device 200A is an example of the "valve device" in the present invention, the valve function portion 210A is an example of the "first portion" in the present invention, and the seal attachment portion 220A is an example of the "second portion" in the present invention. The air passage A6 is an example of the "air passage" in the present invention.

3. Third Embodiment

A third embodiment differs from the first embodiment described above in the configuration of the valve device. Other configurations are basically the same as those in the first embodiment. Here, differences from the first embodiment will be described.

Figure 13:
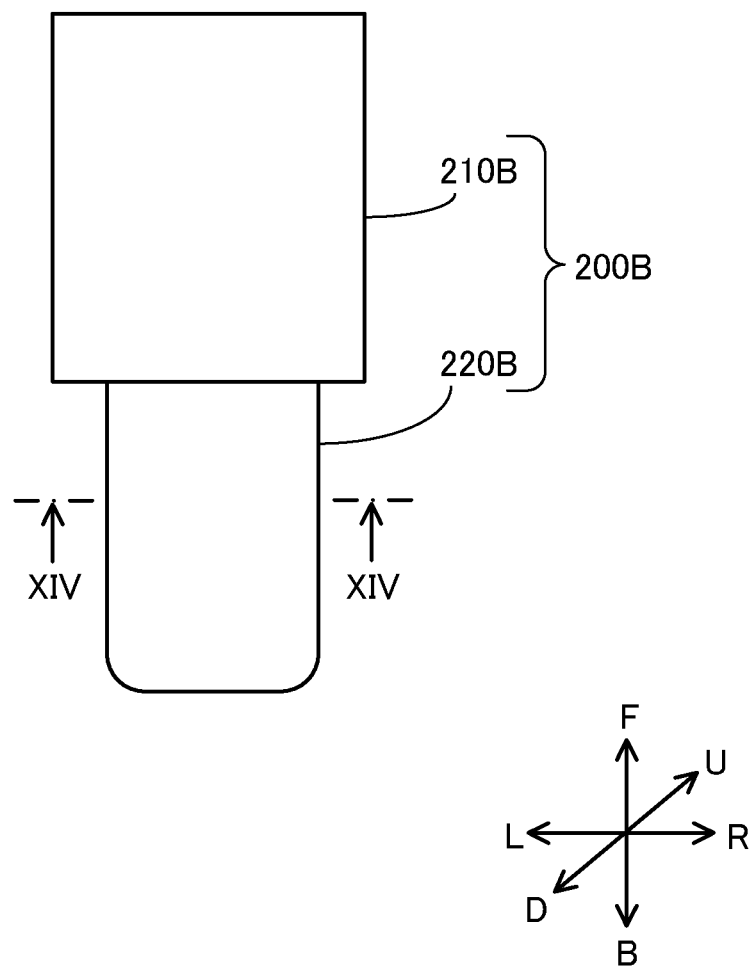
FIG. 13 is a plan view of a valve device according to a third embodiment.

FIG. 13 is a plan view of a valve device 200B that is mounted in a battery according to the third embodiment. As shown in FIG. 13, the valve device 200B includes a valve function portion 210B and a seal attachment portion 220B. At least a portion of the seal attachment portion 220B is sandwiched between the packaging materials 110 and 120 and is subjected to heat sealing. The cross-sectional shape of the seal attachment portion 220B differs from that in the first embodiment. The valve function portion 210B is basically the same as that in the first embodiment, but the shapes of the housing and the valve mechanism are partially changed since an air passage A7 (FIG. 14) formed in the seal attachment portion 220B has a different shape.

Figure 14:
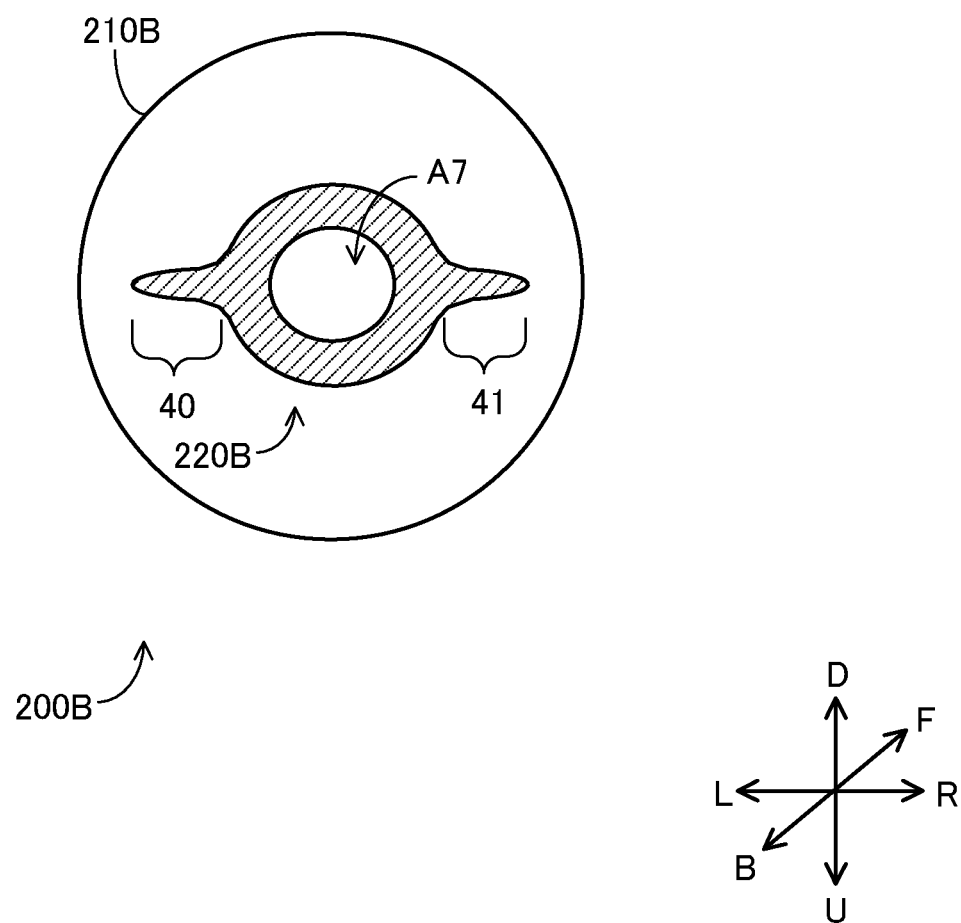
FIG. 14 is a cross-sectional view taken along line XIV-XIV in FIG. 13.

FIG. 14 is a cross-sectional view taken along line XIV-XIV in FIG. 13. As shown in FIG. 14, wing-shaped extended end parts 40 and 41 are formed on both end parts of the seal attachment portion 220B in the width direction (the direction indicated by the arrows L and R) of the battery. The wing-shaped extended end parts 40 and 41 are formed so as to be thinner toward the ends thereof in the width direction of the battery. In other words, it could be said that the wing-shaped extended end parts 40 and 41 are portions in which the length thereof in the thickness direction of the battery gently changes in the direction indicated by the arrows L and R, when compared to the other portion (circular portion) of the seal attachment portion 22.

In the battery according to the third embodiment, the length in the thickness direction of the battery smoothly changes from a portion of the joined edge portion 130 where the seal attachment portion 220B is not sandwiched to a portion of the joined edge portion 130 where the seal attachment portion 220B is sandwiched, when compared to the first embodiment (a case where the wing-shaped extended end parts 40 and 41 are not provided in the seal attachment portion 220B). Accordingly, in this battery, an excessive force is not applied to the packaging materials 110 and 120 at the boundary between a position where the seal attachment portion 220B is sandwiched between the heat-sealable resin layers 35 and a position where the seal attachment portion 220B is not sandwiched between the heat-sealable resin layers 35, and therefore the seal attachment portion 220B of the valve device 200B can be firmly fixed to the housing body 100.

Note that the valve device 200B is an example of the "valve device" in the present invention, the valve function portion 210B is an example of the "first portion" in the present invention, and the seal attachment portion 220B is an example of the "second portion" in the present invention. The wing-shaped extended end parts 40 and 41 are each an example of a "wing-shaped extended end part" in the present invention. The air passage A7 is an example of the "air passage" in the present invention.

4. Fourth Embodiment

A fourth embodiment differs from the first embodiment described above in the configuration of the valve device. Other configurations are basically the same as those in the first embodiment. Here, differences from the first embodiment will be described.

Figure 15:
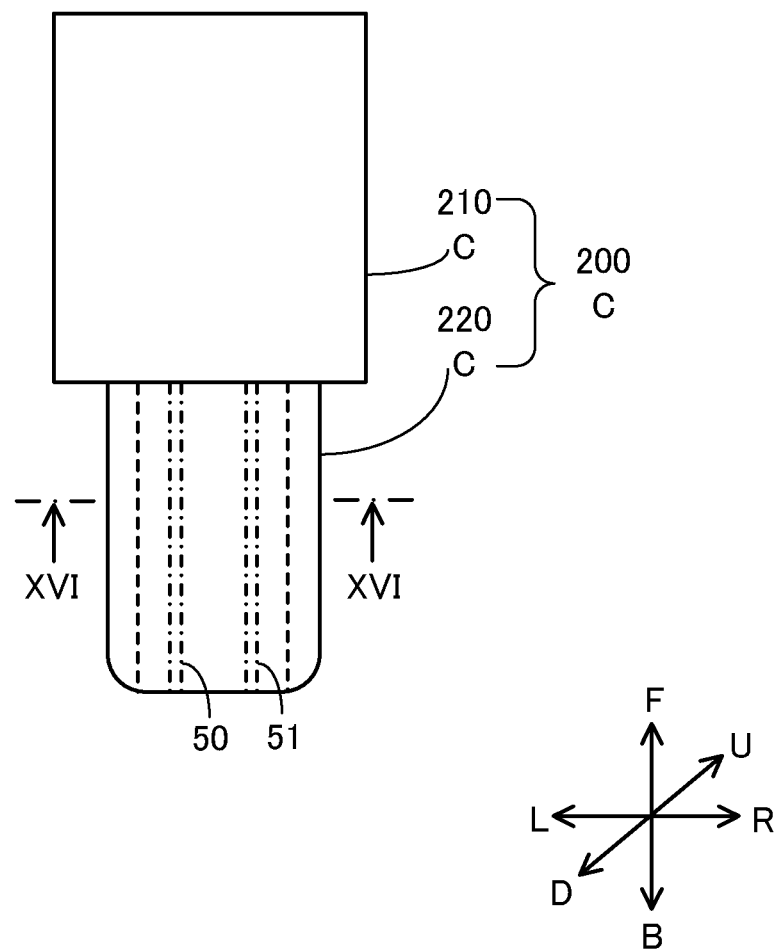
FIG. 15 is a plan view of a valve device according to a fourth embodiment.

FIG. 15 is a plan view of a valve device 200C that is mounted in a battery according to the fourth embodiment. As shown in FIG. 15, the valve device 200C includes a valve function portion 210C and a seal attachment portion 220C. At least a portion of the seal attachment portion 220C is sandwiched between the packaging materials 110 and 120 and is subjected to heat sealing. The cross-sectional shape of the seal attachment portion 220C differs from that in the first embodiment. The valve function portion 210C is basically the same as that in the first embodiment, but the shapes of the housing and the valve mechanism are partially changed since an air passage A2 (FIG. 16) formed in the seal attachment portion 220C has a different shape.

Figure 16:
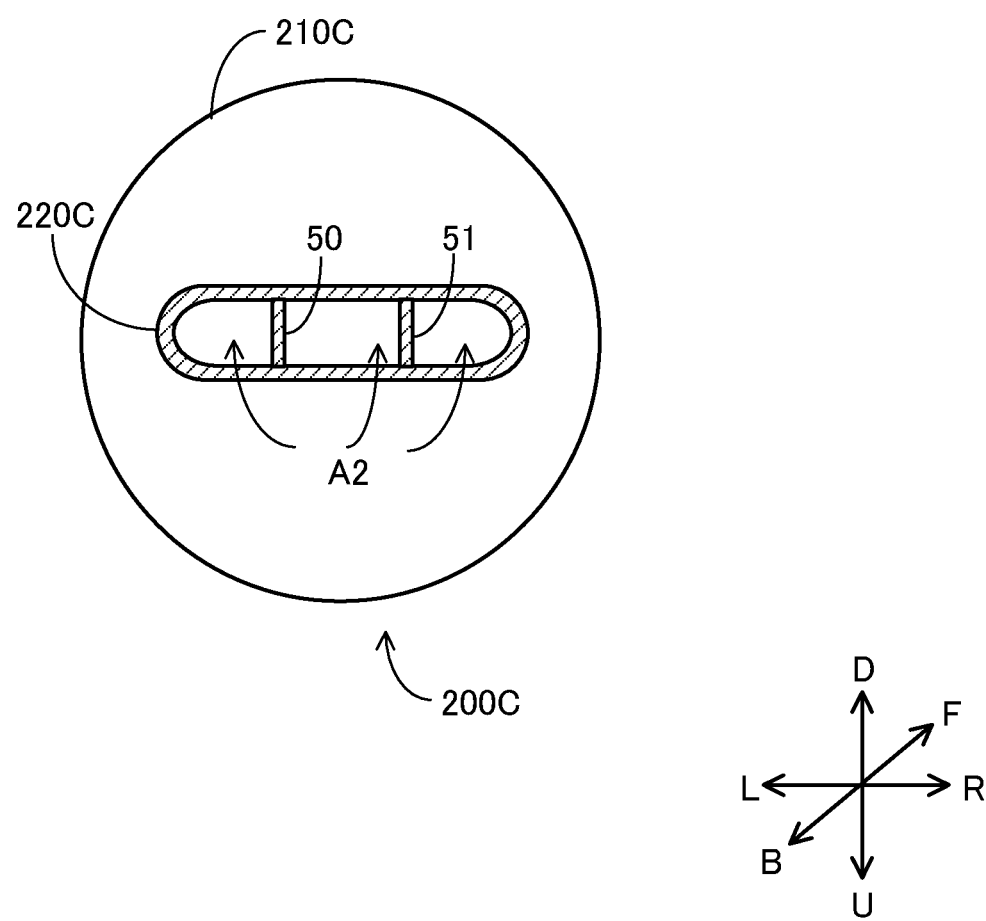
FIG. 16 is a cross-sectional view taken along line XVI-XVI in FIG. 15.

FIG. 16 is a cross-sectional view taken along line XVI-XVI in FIG. 15. As shown in FIG. 16, pillars 50 and 51 are formed inside the seal attachment portion 220C (in the air passage A2). The pillars 50 and 51 each extend in the thickness direction (the direction indicated by the arrows U and D) of the battery, and both ends of each pillar in the thickness direction of the battery are connected to an inner peripheral surface of the seal attachment portion 220C. Also, the pillars 50 and 51 each extend in the direction indicated by the arrows F and B in the air passage A2 (FIG. 15). Note that the number of pillars does not necessarily have to be two, and it is sufficient that at least one pillar is provided.

In the battery according to the fourth embodiment, the pillars 50 and 51 are formed in the air passage A2, and therefore, the air passage A2 is maintained even if pressure and heat are applied to the seal attachment portion 220C sandwiched between the mutually facing heat-sealable resin layers 35. Therefore, according to this battery, the air passage A2 in the seal attachment portion 220C can be kept from breaking when the mutually facing heat-sealable resin layers 35 are fused.

Note that the valve device 200C is an example of the "valve device" in the present invention, the valve function portion 210C is an example of the "first portion" in the present invention, and the seal attachment portion 220C is an example of the "second portion" in the present invention. The pillars 50 and 51 are each an example of a "pillar" in the present invention. The air passage A2 is an example of the "air passage" in the present invention.

5. Fifth Embodiment

A fifth embodiment differs from the first embodiment described above in the configuration of the valve device. Other configurations are basically the same as those in the first embodiment. Here, differences from the first embodiment will be described.

Figure 17:
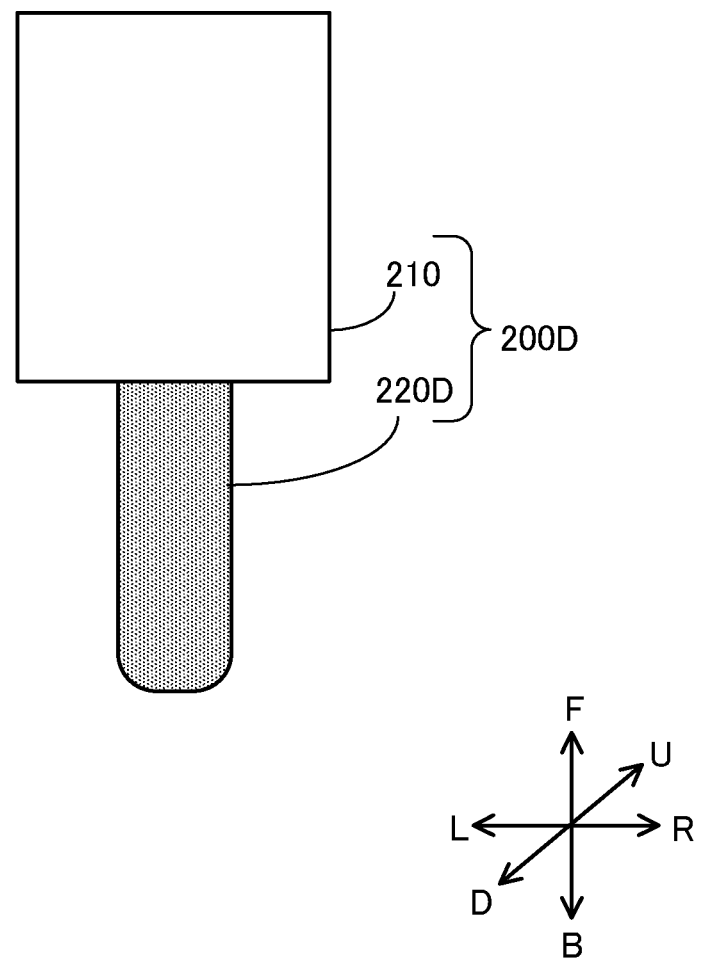
FIG. 17 is a plan view of a valve device according to a fifth embodiment.

FIG. 17 is a plan view of a valve device 200D that is mounted in a battery according to the fifth embodiment. As shown in FIG. 17, the valve device 200D includes a valve function portion 210 and a seal attachment portion 220D. The configuration of the valve function portion 210 is the same as that in the first embodiment.

At least a portion of the seal attachment portion 220D is sandwiched between the packaging materials 110 and 120 and is subjected to heat sealing. The outer surface of the seal attachment portion 220D differs from that in the first embodiment. Specifically, the outer surface of the seal attachment portion 220D has a satin finish surface. The satin finish surface has a surface roughness Ra of 1 μm to 20 μm, for example.

In the battery according to the fifth embodiment, the outer surface of the seal attachment portion 220D has a satin finish surface, and accordingly, the heat-sealable resin easily melts at positions where the resin is in contact with the seal attachment portion 220D. Therefore, according to this battery, the seal attachment portion 220D of the valve device 200D can be more firmly fixed to the housing body 100, when compared to the first embodiment (a case where the outer surface of the seal attachment portion 220D is smooth).

Note that the valve device 200D is an example of the "valve device" in the present invention, and the seal attachment portion 220D is an example of the "second portion" in the present invention.

6. Sixth Embodiment

A sixth embodiment differs from the first embodiment described above in the configuration of the valve device. Other configurations are basically the same as those in the first embodiment. Here, differences from the first embodiment will be described.

Figure 18:
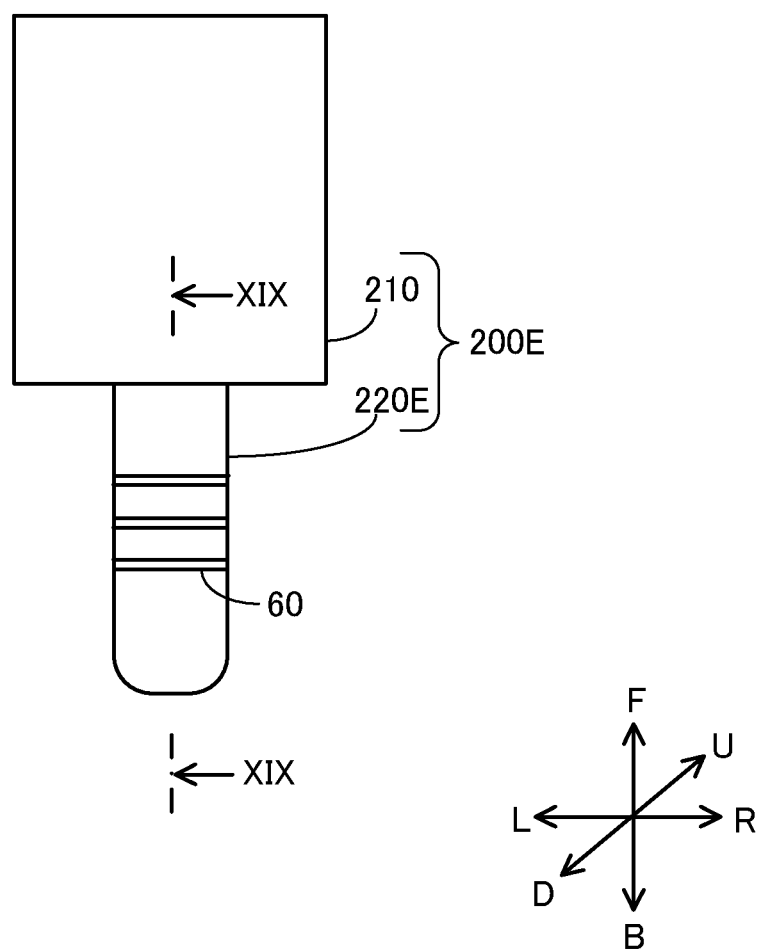
FIG. 18 is a plan view of a valve device according to a sixth embodiment.

FIG. 18 is a plan view of a valve device 200E that is mounted in a battery according to the sixth embodiment. As shown in FIG. 18, the valve device 200E includes a valve function portion 210 and a seal attachment portion 220E. The configuration of the valve function portion 210 is the same as that in the first embodiment.

At least a portion of the seal attachment portion 220E is sandwiched between the packaging materials 110 and 120 and is subjected to heat sealing. The outer surface of the seal attachment portion 220E differs from that in the first embodiment. Specifically, linear protrusions 60 that continuously extend over the whole circumference of the seal attachment portion 220E are formed on the outer surface. Three linear protrusions 60 are formed in the direction indicated by the arrows F and B in the seal attachment portion 220E. Note that the number of linear protrusions 60 does not necessarily have to be three, and it is sufficient that at least one linear protrusion is provided.

Figure 19:
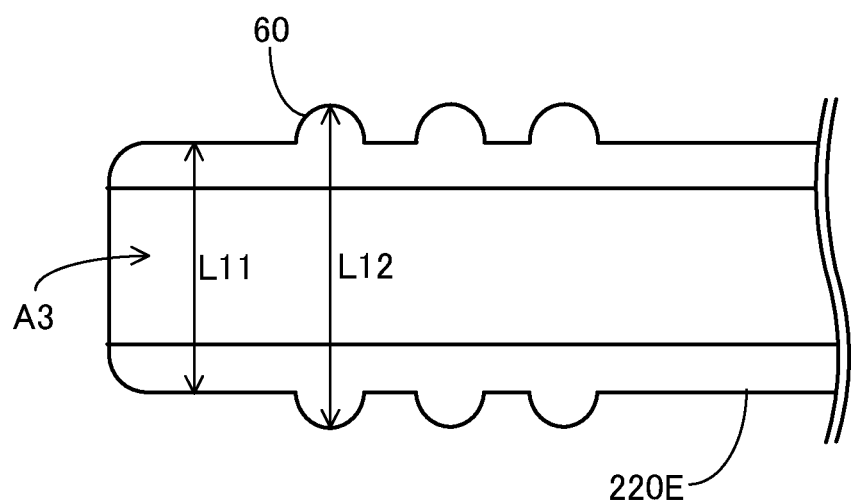
FIG. 19 is a cross-sectional view taken along line XIX-XIX in FIG. 18.
Figure 19:
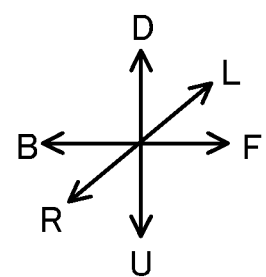

FIG. 19 is a cross-sectional view taken along line XIX-XIX in FIG. 18. As shown in FIG. 19, a cross section of each linear protrusion 60 has a semicircular shape. R of the semicircular shape is 0.05 mm to 1.0 mm, for example. A diameter L12 (the length in the thickness direction of the battery and the length in the width direction of the battery) of a portion of the seal attachment portion 220E where the linear protrusion 60 is formed is larger than a diameter L11 of a portion of the seal attachment portion 220E where the linear protrusion 60 is not formed.

The linear protrusions 60 securely come into contact with the heat-sealable resin layers 35 during the heat sealing process, and accordingly, are easily fused with the packaging materials 110 and 120. In the battery according to the sixth embodiment, the linear protrusions 60 continuously extend over the whole circumference of the seal attachment portion 220E on its outer surface. Therefore, according to this battery, the heat-sealable resin layers 35 and the seal attachment portion 220E can be fused over the whole circumference of the seal attachment portion 220E. Also, in this battery, the area of contact between the outer surface of the seal attachment portion 220E and the heat-sealable resin is large, when compared to the first embodiment (a case where the linear protrusions 60 are not formed in the seal attachment portion 220E), and therefore the seal attachment portion 220E of the valve device 200E can be firmly fixed to the packaging material 110.

Note that the valve device 200E is an example of the "valve device" in the present invention, and the seal attachment portion 220E is an example of the "second portion" in the present invention. The linear protrusions 60 are each an example of a "linear protrusion" in the present invention. The air passage A3 is an example of the "air passage" in the present invention.

Although the linear protrusions 60 in the sixth embodiment continuously extend over the whole circumference, the linear protrusions 60 are only required to extend in the circumferential direction, and do not necessarily have to extend over the whole circumference or be continuous. For example, in a case where the wing-shaped extended end parts 40 and 41 are provided as in the third embodiment described above, the linear protrusions 60 need not extend over the whole circumference including the wing-shaped extended end parts 40 and 41, and a configuration is also possible in which the linear protrusions 60 are not provided in leading end parts of the wing-shaped extended end parts 40 and 41, the linear protrusions 60 are not provided in the wing-shaped extended end parts 40 and 41, or the linear protrusions 60 are intermittently formed in the circumferential direction.

7. Seventh Embodiment

A seventh embodiment differs from the first embodiment described above in the configuration of the valve device. Other configurations are basically the same as those in the first embodiment. Here, differences from the first embodiment will be described.

Figure 20:
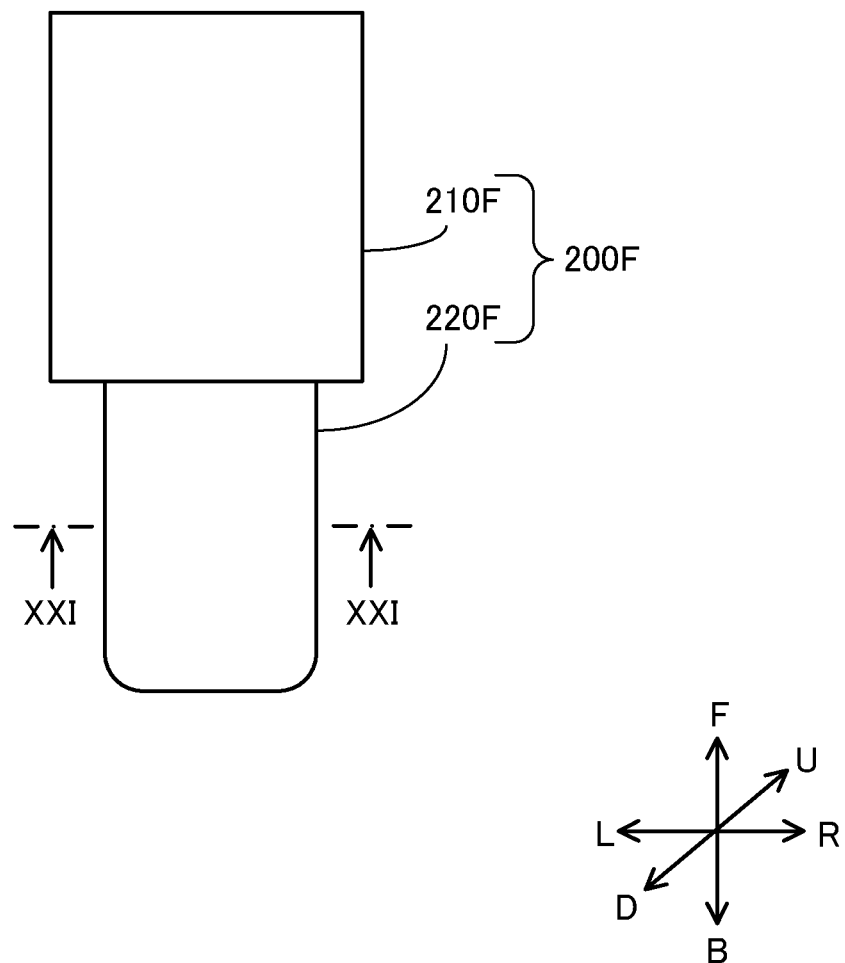
FIG. 20 is a plan view of a valve device according to a seventh embodiment.

FIG. 20 is a plan view of a valve device 200F that is mounted in a battery according to the seventh embodiment. As shown in FIG. 20, the valve device 200F includes a valve function portion 210F and a seal attachment portion 220F. At least a portion of the seal attachment portion 220F is sandwiched between the packaging materials 110 and 120 and is subjected to heat sealing. The cross-sectional shapes of the valve function portion 210F and the seal attachment portion 220F differ from those in the first embodiment.

Figure 21:
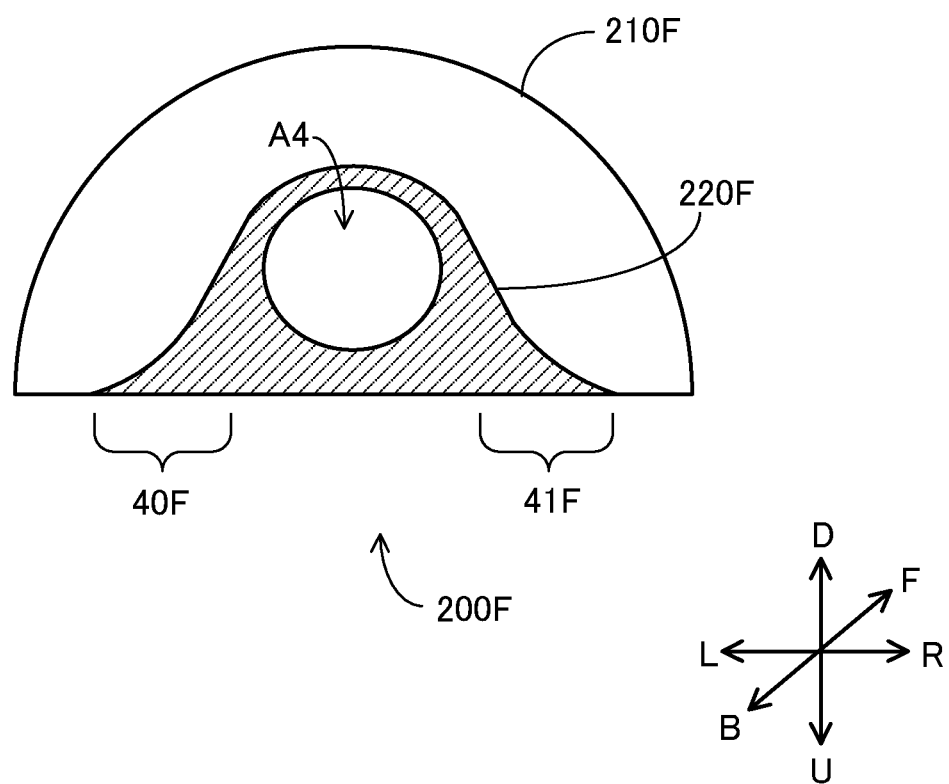
FIG. 21 is a cross-sectional view taken along line XXI-XXI in FIG. 20.

FIG. 21 is a cross-sectional view taken along line XXI-XXI in FIG. 20. As shown in FIG. 21, a cross section of the valve function portion 210F has a semicircular shape. That is, a surface of the valve function portion 210F in the direction of the arrow U is a flat surface. Also, a cross section of the seal attachment portion 220F includes wing-shaped extended end parts 40F and 41F on both end parts in the direction indicated by the arrows L and R. A surface of the seal attachment portion 220F in the direction of the arrow U is a flat surface. The surface of the valve function portion 210F in the direction of the arrow U and the surface of the seal attachment portion 220F in the direction of the arrow U are flush with each other.

Accordingly, if the valve device 200F is arranged such that the surface in the direction of the arrow U faces downward, the valve device 200F does not roll over. According to the battery of the seventh embodiment, the valve device 200F does not roll over when the valve device 200F is to be attached to the housing body 100, and therefore the valve device 200F can be easily positioned.

Figure 22:
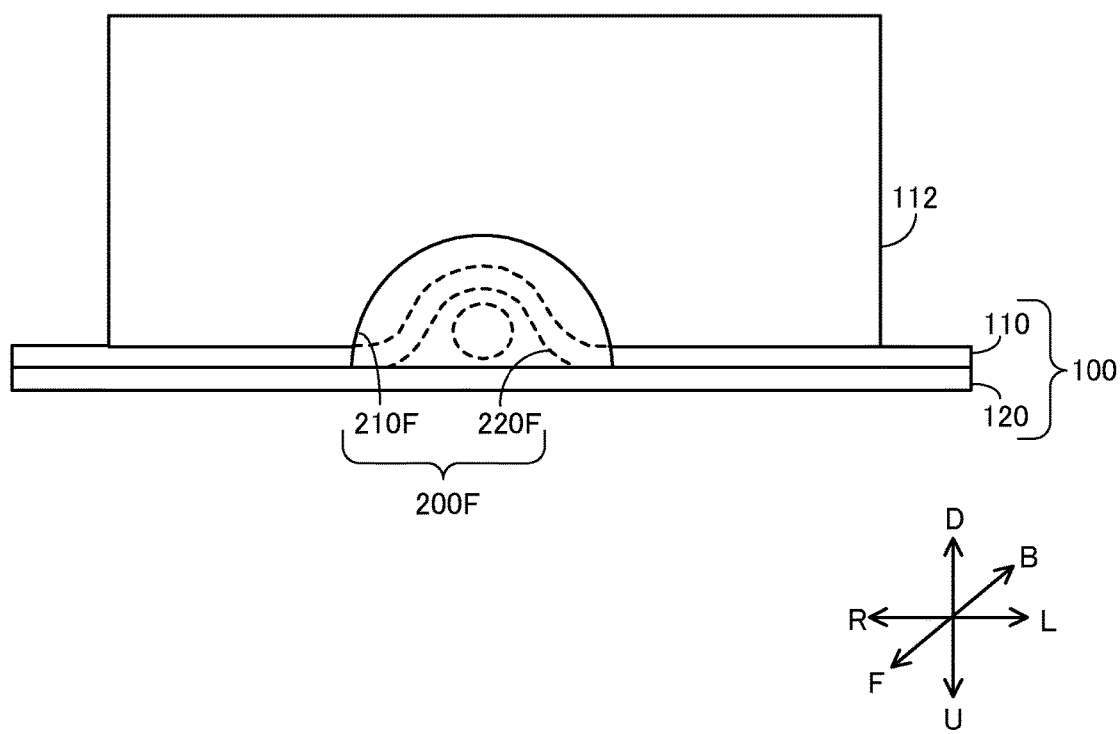
FIG. 22 is a diagram showing a state where the valve device is to be attached to the housing body.

FIG. 22 is a diagram showing a state where the valve device 200F is to be attached to the housing body 100. As shown in FIG. 22, the flat surface of the valve device 200F is placed on a surface of the innermost layer of the packaging material 120 when the valve device 200F is to be attached to the housing body 100. In this state, the valve device 200F does not roll over. Therefore, according to the battery of the seventh embodiment, the valve device 200F can be easily positioned when the valve device 200F is to be attached to the housing body 100. Also, in a state where the battery is complete, a bulge of the joined edge portion 130 that is formed by the valve device 200F can be oriented in the direction in which the housing body 100 bulges, i.e., in the upward direction in FIG. 22 in which the molded part 112 protrudes.

Note that the valve device 200F is an example of the "valve device" in the present invention, the valve function portion 210F is an example of the "first portion" in the present invention, and the seal attachment portion 220F is an example of the "second portion" in the present invention. The air passage A4 is an example of the "air passage" in the present invention.

8. Variations

Although the first to seventh embodiments have been described, the present invention is not limited to the first to seventh embodiments described above, and various changes can be made without departing from the gist of the present invention. The following describes variations. Note that the following variations can be appropriately combined.

8-1

In the first to seventh embodiments described above, the cross-sectional shape of the seal attachment portion (e.g., the seal attachment portion 220) is based on a circular shape. However, the cross-sectional shape of the seal attachment portion is not limited to such a shape. For example, the cross-sectional shape of the seal attachment portion may also be based on a polygonal shape.

Figure 23:
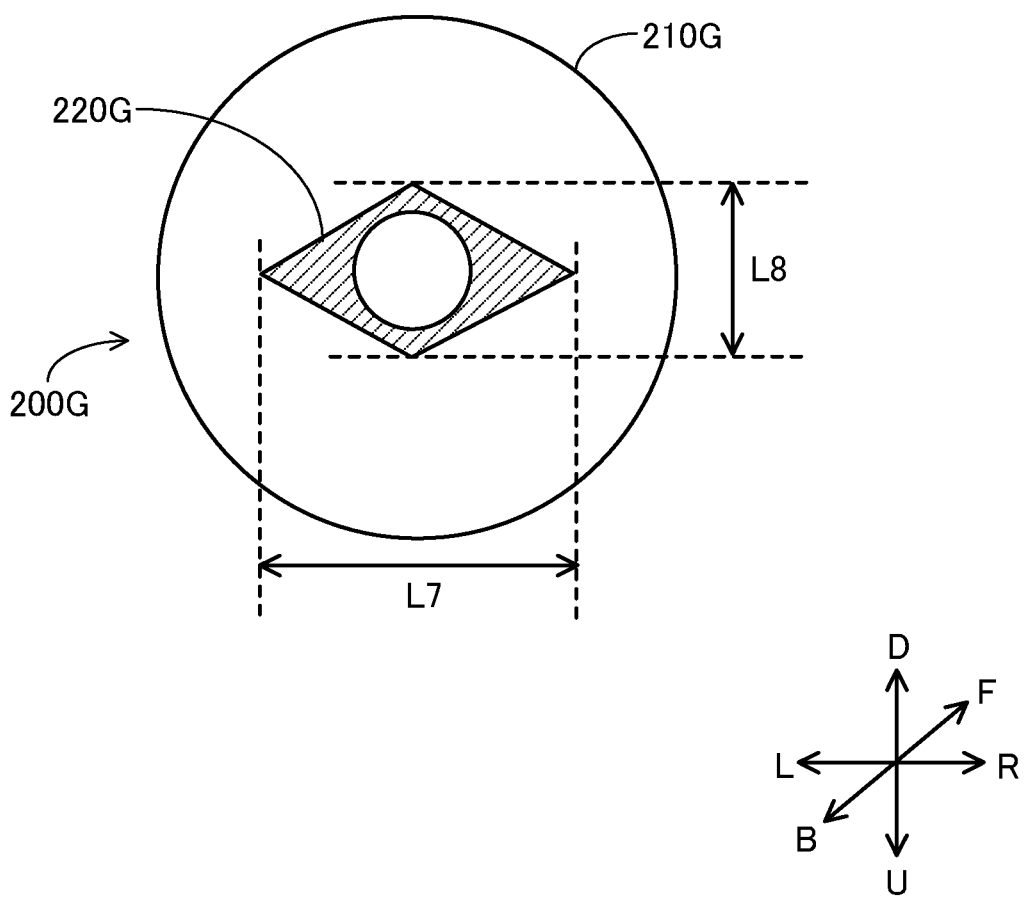
FIG. 23 is a diagram showing a cross section of a valve device according to a first variation.

FIG. 23 is a diagram showing a cross section of a valve device 200G according to a first variation. As shown in FIG. 23, a cross section of a seal attachment portion 220G of the valve device 200G has a rhombic shape. A length L7 of the seal attachment portion 220G in the width direction of the battery is longer than a length L8 of the seal attachment portion 220G in the thickness direction of the battery. In the thickness direction of the battery described above, the difference between a length of a portion of the joined edge portion 130 where the seal attachment portion 220G is sandwiched and a length of a portion of the joined edge portion 130 where the seal attachment portion 220G is not sandwiched is further reduced. Therefore, according to this battery, it is possible to appropriately apply pressure and heat to the heat-sealable resin layers 35 over the entire periphery of the housing body 100 and appropriately fuse the mutually facing heat-sealable resin layers 35, and accordingly, the seal attachment portion 220G of the valve device 200G can be firmly fixed to the housing body 100.

Figure 24:
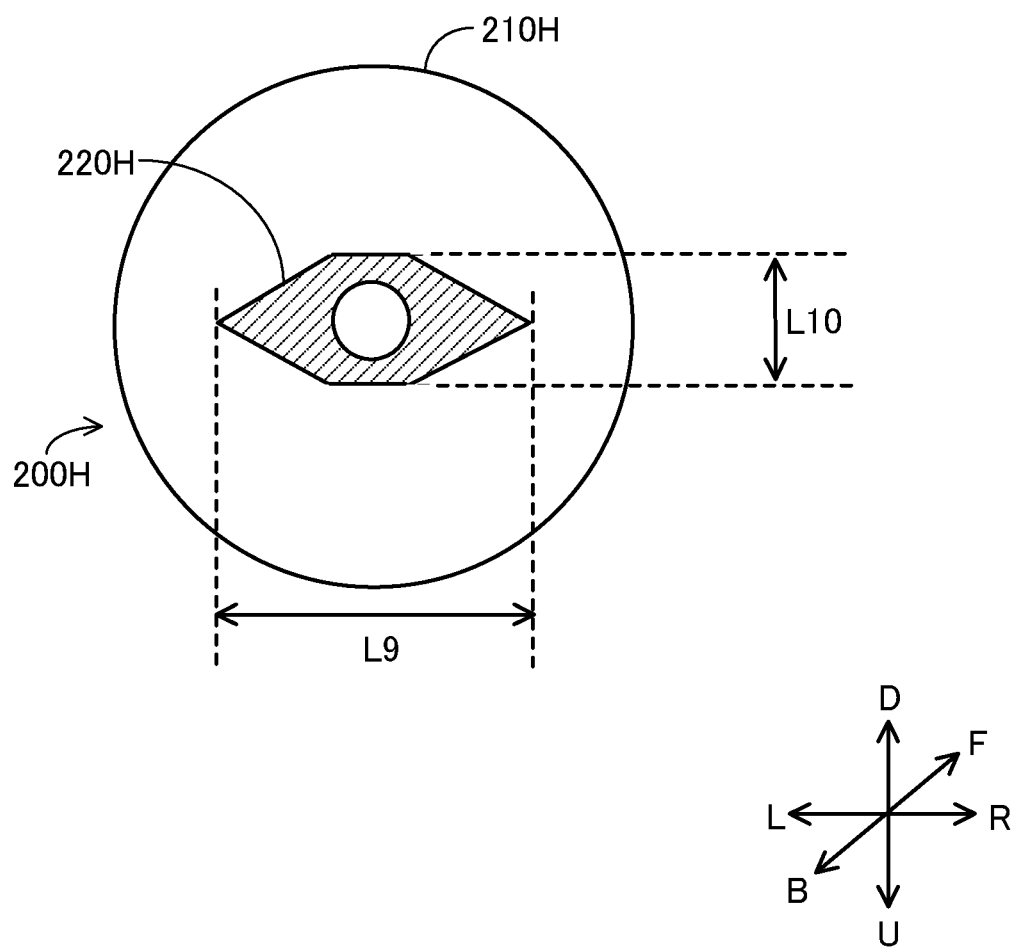
FIG. 24 is a diagram showing a cross section of a valve device according to a second variation.

FIG. 24 is a diagram showing a cross section of a valve device 200H according to a second variation. As shown in FIG. 24, a cross section of a seal attachment portion 220H of the valve device 200H has a rhombic shape of which both end parts in the thickness direction of the battery are chamfered, or a hexagonal shape. A length L9 of the seal attachment portion 220H in the width direction of the battery is longer than a length L10 of the seal attachment portion 220H in the thickness direction of the battery. In the thickness direction of the battery described above, the difference between a length of a portion of the joined edge portion 130 where the seal attachment portion 220H is sandwiched and a length of a portion of the joined edge portion 130 where the seal attachment portion 220H is not sandwiched is further reduced. Therefore, according to this battery, it is possible to appropriately apply pressure and heat to the heat-sealable resin layers 35 over the entire periphery of the housing body 100 and appropriately fuse the mutually facing heat-sealable resin layers 35, and accordingly, the seal attachment portion 220H of the valve device 200H can be firmly fixed to the housing body 100.

Figure 25:
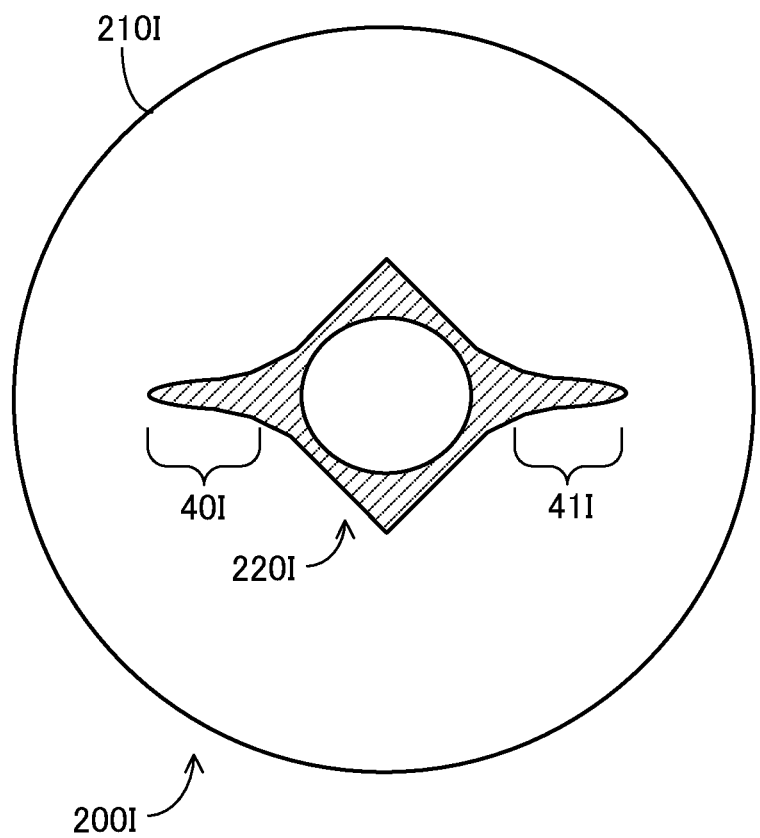
FIG. 25 is a diagram showing a cross section of a valve device according to a third variation.
Figure 25:
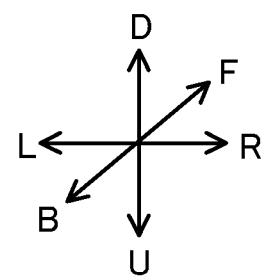

FIG. 25 is a diagram showing a cross section of a valve device 200I according to a third variation. As shown in FIG. 25, a cross section of a seal attachment portion 200I of the valve device 200I has a shape that is obtained by providing wing-shaped extended end parts 401 and 411 on both end parts of a rhombic shape (in the width direction of the battery). In this battery, the length in the thickness direction of the battery smoothly changes from a portion of the joined edge portion 130 where the seal attachment portion 200I is not sandwiched to a portion of the joined edge portion 130 where the seal attachment portion 200I is sandwiched, when compared to the first embodiment (a case where the wing-shaped extended end parts 401 and 411 are not provided in the seal attachment portion 200I), for example. Accordingly, in this battery, an excessive force is not applied to the packaging materials 110 and 120 at the boundary between a position where the seal attachment portion 220I is sandwiched between the heat-sealable resin layers 35 and a position where the seal attachment portion 220I is not sandwiched between the heat-sealable resin layers 35, and therefore the seal attachment portion 220I of the valve device 200I can be firmly fixed to the housing body 100.

Figure 26:
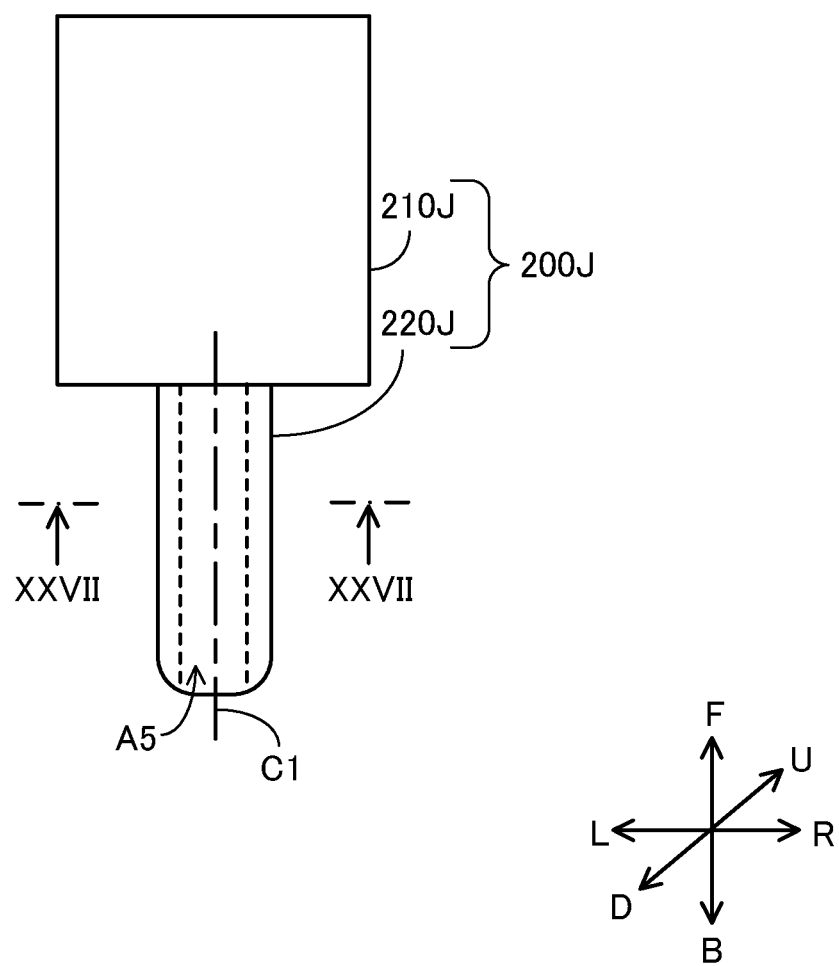
FIG. 26 is a diagram showing a cross section of a valve device according to a fourth variation.

FIG. 26 is a plan view of a valve device 200J according to a fourth variation. As shown in FIG. 26, the valve device 200J includes a valve function portion 210J and a seal attachment portion 220J. An air passage A5 is formed inside the seal attachment portion 220J.

Figure 27:
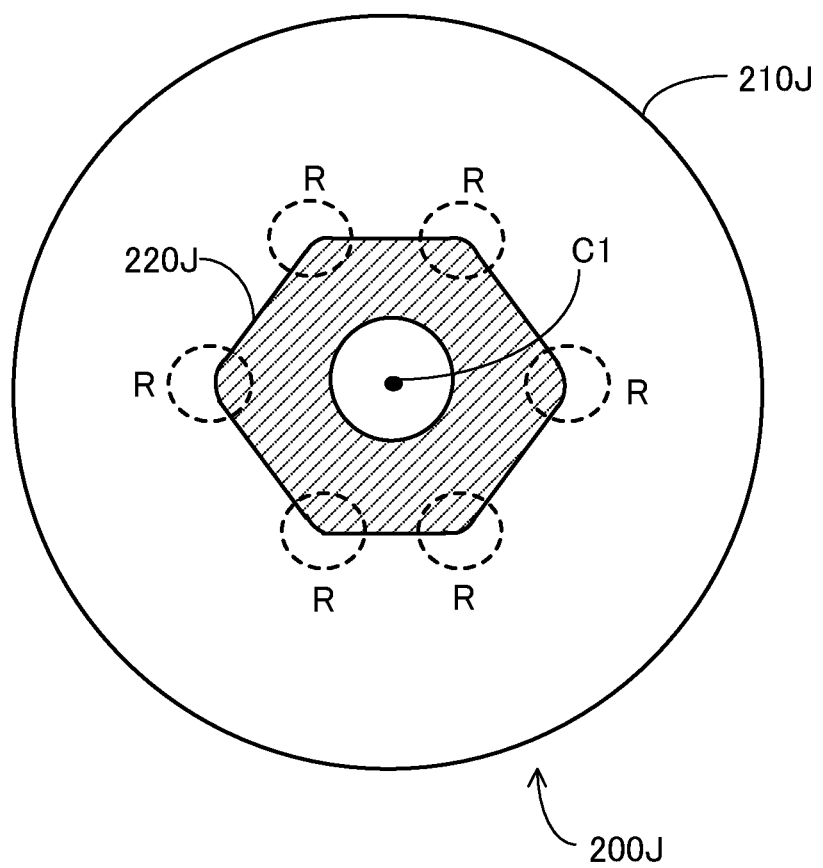
FIG. 27 is a cross-sectional view taken along line XXVII-XXVII in FIG. 26.
Figure 27:
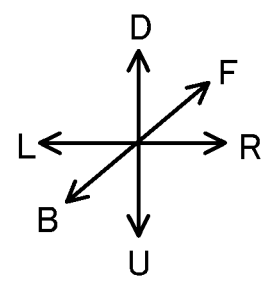

FIG. 27 is a cross-sectional view taken along line XXVII-XXVII in FIG. 26. This cross section can also be said as being a surface with respect to which a center line C1 of the air passage A5 is the normal line. As shown in FIG. 27, the cross section of the seal attachment portion 220J of the valve device 200J has a hexagonal shape (polygonal shape). Rs (e.g., R=0.2 mm to 2.0 mm) are formed at corners of the hexagonal shape. According to this battery, for example, it is possible to reduce the possibility that a portion of the seal attachment portion 220J located in the housing body 100 will damage the battery element 400 in the housing body 100, and reduce the possibility that a portion of the seal attachment portion 220J sandwiched between the heat-sealable resin layers 35 will damage the heat-sealable resin layers 35 and impair the insulating performance of the heat-sealable resin layers 35.

8-2

In the first to seventh embodiments described above, the flange portion 114 of the packaging material 110 is flat. However, the shape of the flange portion 114 is not limited to such a shape. For example, a valve device arrangement portion for arranging the seal attachment portion 220 of the valve device 200 may also be formed in the flange portion 114 in advance.

Figure 28:
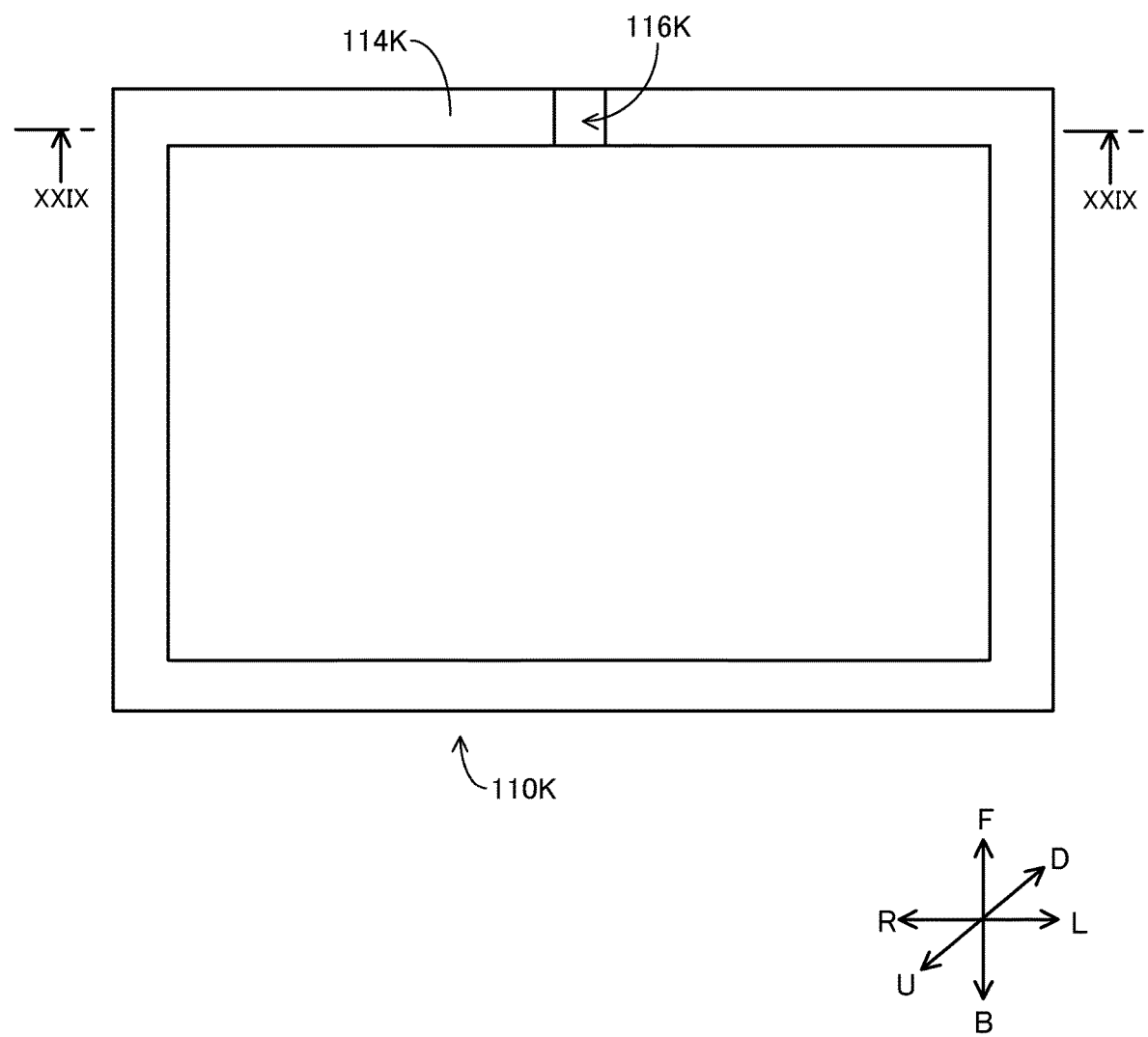
FIG. 28 is a plan view of a packaging material according to a fifth variation.

FIG. 28 is a plan view of a packaging material 110K according to a fifth variation. As shown in FIG. 28, a valve device arrangement portion 116K is formed in the flange portion 114K.

Figure 29:
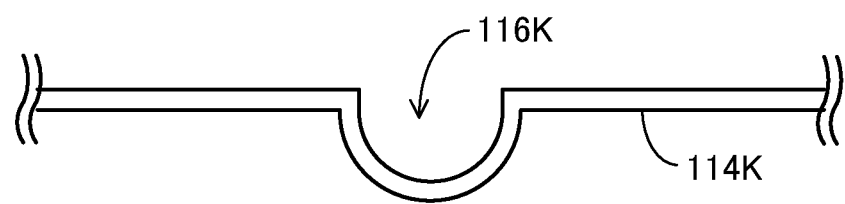
FIG. 29 is a cross-sectional view taken along line XXIX-XXIX in FIG. 28.

FIG. 29 is a cross-sectional view taken along line XXIX-XXIX in FIG. 28. As shown in FIG. 29, the valve device arrangement portion 116K formed in the flange portion 114K has a semicircular shape. The diameter of this semicircle is slightly larger than the diameter of the seal attachment portion 220, for example. Heat sealing is performed on the peripheral edge portion of the housing body in a state where the seal attachment portion 220 is arranged in the valve device arrangement portion 116K, for example. As a result, deformation of the packaging material during the heat sealing process is suppressed, and it is possible to reduce the possibility that pinholes will be formed or the packaging material will break in the vicinity of the seal attachment portion 220. Note that the valve device arrangement portion 116K does not necessarily have to be provided in the packaging material 110K, and may also be provided in the packaging material 120. In this case as well, it is possible to achieve effects similar to those achieved in the case where the valve device arrangement portion 116K is provided in the packaging material 110K.

8-3

In the first to seventh embodiments described above, only a portion of the seal attachment portion (e.g., the seal attachment portion 220) is sandwiched between the heat-sealable resin layers 35 in the joined edge portion 130. However, the attached state of the seal attachment portion is not limited to such a state. For example, the entire seal attachment portion may also be sandwiched between the heat-sealable resin layers 35 in the joined edge portion 130. In this case as well, Rs are formed at corners of the end part of the seal attachment portion (e.g., the seal attachment portion 220) on the side opposite to the valve function portion (e.g., the valve function portion 210) in a plan view, and therefore the end part is unlikely to damage the heat-sealable resin layers 35 and impair the insulating performance of the heat-sealable resin layers 35.

8-4

In the first to seventh embodiments described above, a step is formed at the boundary between the valve function portion (e.g., the valve function portion 210) and the seal attachment portion (e.g., the seal attachment portion 220) of the valve device (e.g., the valve device 200). However, the step does not necessarily have to be formed at the boundary between the valve function portion and the seal attachment portion. For example, a configuration is also possible in which the diameter of the cross section of the valve function portion is the same as the diameter of the cross section of the seal attachment portion, and the valve function portion and the seal attachment portion are continuous with each other forming a flat surface.

8-5
In the first to seventh embodiments described above, the cross-sectional shape of the air passage (e.g., the air passage A1) formed in the seal attachment portion (e.g., the seal attachment portion 220) is based on a circular shape. However, the cross-sectional shape of the air passage is not limited to such a shape. For example, the cross-sectional shape of the air passage may also be based on a polygonal shape.

8-6
In the first to seventh embodiments described above, Rs are formed at corners of the end part of the seal attachment portion (e.g., the seal attachment portion 220) on the side opposite to the valve function portion (e.g., the valve function portion 210). However, Rs do not necessarily have to be formed at the corners.

8-7
In the first to seventh embodiments described above, the valve device (e.g., the valve device 200) is a return valve. However, the valve device does not necessarily have to be a return valve. The valve device may also be a breaking valve or a selective permeation valve.

8-8
In the first to seventh embodiments described above, the tabs 300 are provided in both end parts of the housing body 100 in the direction indicated by the arrows L and R, and the valve device (e.g., the valve device 200) is provided in the end part of the housing body 100 in the direction of the arrow F (see FIG. 1 again). However, the positional relationship between the valve device 200 and the tabs 300 is not limited to such a relationship. For example, a configuration is also possible in which both of the tabs 300 are arranged on the same side of the peripheral edge portion of the housing body 100 and the valve device is arranged between the two tabs 300, or both of the tabs 300 are arranged on the same side of the peripheral edge portion of the housing body 100 and the valve device is arranged on any of three sides other than the side on which the tabs 300 are arranged.

8-9
In the first to seventh embodiments described above, the housing body 100 includes the packaging material 110 that is formed through embossing or the like and the packaging material 120 that is separate from the packaging material 110. However, the housing body 100 does not necessarily have to have such a configuration.

For example, the packaging material 110 and the packaging material 120 may also be formed as a single piece (i.e., connected) in advance so as to share a side. In this case, a configuration is also possible in which the packaging material 110 and the packaging material 120 are formed as a single piece (i.e., connected) in an end part of the flange portion 114 of the packaging material 110, and the battery element 400 is sealed in the housing body 100 by sealing four sides in a state where the packaging materials 110 and 120 are overlaid on each other. Alternatively, a configuration is also possible in which the flange portion 114 is omitted along the side at which the packaging materials 110 and 120 are connected, and the battery element 400 is sealed in the housing body 100 by sealing three sides in a state where the packaging materials 110 and 120 are overlaid on each other.

Also, the packaging material 120 may also be formed so as to have a shape similar to that of the packaging material 110, for example. The housing body 100 may also be a pouch-type housing body, for example. The pouch-type housing body may be any of a three-side sealing type, a four-side sealing type, a pillow type, a gusset type, and the like.

8-10
In the first to seventh embodiments described above, the housing of the valve function portion (e.g., the valve function portion 210) and the housing of the seal attachment portion (e.g., the seal attachment portion 220) are made of the same material (resin). However, the housing of the valve function portion and the housing of the seal attachment portion do not necessarily have to be made of the same material. For example, a configuration is also possible in which the housing of the valve function portion and the housing of the seal attachment portion are made of different materials, and the material of the valve function portion has a higher melting point than the material of the seal attachment portion. For example, the seal attachment portion may be made of polypropylene (PP) and the valve function portion may be made of a resin that has a higher melting point than PP (e.g., a fluorine-based resin, a polyester-based resin, a polyimide-based resin, a polycarbonate-based resin, or an acrylic resin) or metal. Fluorocarbon resins that have a good barrier property are preferably used for the seal attachment portion.

In this battery, the material of the valve function portion has a higher melting point than the material of the seal attachment portion, and therefore the valve function portion is unlikely to deform due to heat even if pressure and heat are applied to the seal attachment portion when the mutually facing heat-sealable resin layers 35 are fused. Therefore, according to this battery, the valve mechanism in the valve function portion can be kept from breaking when the mutually facing heat-sealable resin layers 35 are fused.

8-11
In the first to seventh embodiments described above, the housing of the valve device 200 is made of resin and the seal attachment portion 220 is directly sandwiched between the heat-sealable resin layers 35. However, the housing of the valve device 200 does not necessarily have to be made of resin, and may also be made of metal (e.g., aluminum or stainless steel). In this case, an adhesive protective film may also be arranged between the seal attachment portion 220 and the heat-sealable resin layers 35. The adhesive protective film is configured such that one surface adheres at least to resin and the other surface adheres at least to metal. Various known adhesive protective films can be employed as the adhesive protective film, and an adhesive protective film that is the same as the tab films 310 can be used, for example.

8-13
In the first to seventh embodiments described above, Rs are formed on the outer peripheral side of the seal attachment portion (e.g., the seal attachment portion 220, i.e., at corners of the end part of the seal attachment portion on the side opposite to the valve function portion (e.g., the valve function portion 210)), but Rs are not formed on the inner peripheral side of the seal attachment portion (i.e., in an end part of the air passage (e.g., the air passage A1)). However, Rs may also be formed on the inner peripheral side of the seal attachment portion. If Rs are formed on the inner peripheral side of the seal attachment portion, it is possible to reduce the possibility that corners on the inner peripheral side of the seal attachment portion will be chipped and chips (e.g., pieces of resin, metal, etc.) will fall into the housing body 100.

8-13
In the seventh embodiment described above, flat surfaces are formed in outer surfaces of both the valve function portion 210F and the seal attachment portion 220F (see FIG. 21 again). However, it is not always necessary to form flat surfaces in the outer surfaces of both the valve function portion 210F and the seal attachment portion 220F. It is sufficient to form a flat surface in the outer surface of at least one of the valve function portion 210F and the seal attachment portion 220F.

8-14

The battery 10 according to the first to seventh embodiments described above is a secondary battery, but is defined as being what outputs electricity, and accordingly encompasses power storage devices such as capacitors, electric double layer capacitors (EDLCs), and lithium ion capacitors. Also, the type of secondary battery is not specifically limited, and examples of the secondary battery include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, multivalent cation batteries, and solid-state batteries.

8-15

In the first to seventh embodiments described above, an adhesive film that is configured to adhere to both the seal attachment portion (e.g., the seal attachment portion 220) and the packaging materials 110 and 120 may also be arranged between the seal attachment portions 220 and 220A to 220J and the packaging materials 110 and 120. Such an example will be described below in detail.

Figure 30:
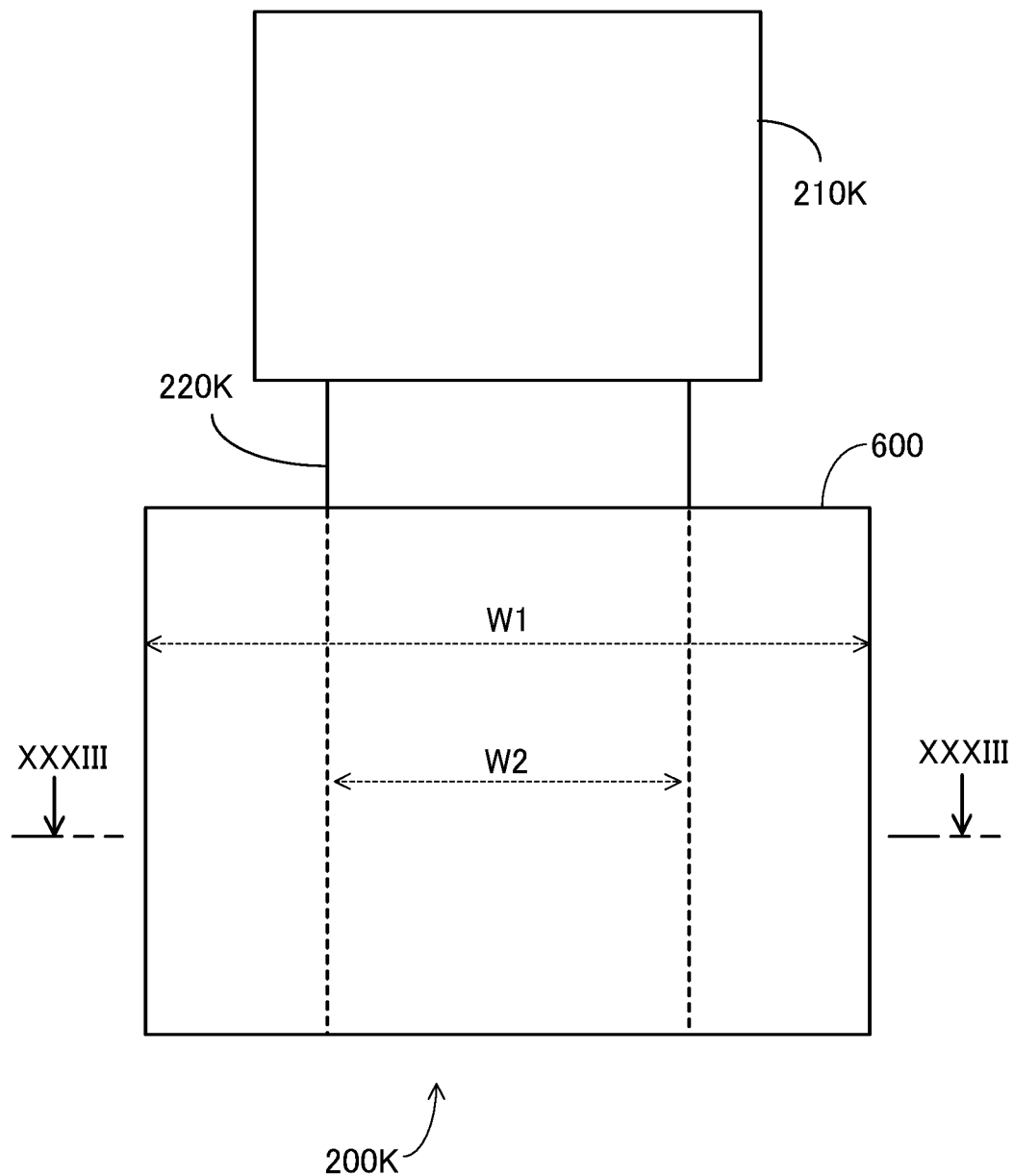
FIG. 30 is a plan view of a valve device according to another variation.
Figure 31:
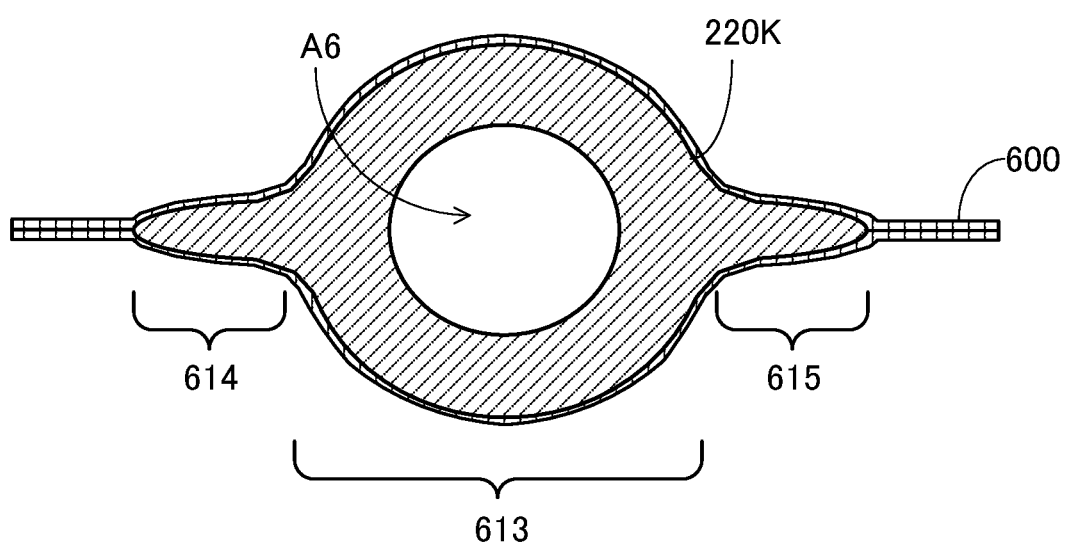
FIG. 31 is a cross-sectional view taken along line XXXI-XXXI in FIG. 30.

FIG. 30 is a plan view of a valve device 200K. FIG. 31 is a cross-sectional view taken along line XXXI-XXXI in FIG. 30. As shown in FIGS. 30 and 31, the valve device 200K includes a valve function portion 210K, a seal attachment portion 220K, and an adhesive film 600. That is, the adhesive film 600 that corresponds to an adhesive member is attached to the seal attachment portion 220K of the valve device 200K in advance. The valve function portion 210K and the seal attachment portion 220K are made of metal. The valve function portion 210K and the seal attachment portion 220K are made of aluminum, brass, stainless steel, or the like. Note that the valve function portion 210K and the seal attachment portion 220K do not necessarily have to be made of metal, and may also be made of resin, for example.

The adhesive film 600 is configured to adhere to both the seal attachment portion 220K and the heat-sealable resin layers 35 (FIG. 4) of the packaging materials 110 and 120 through heat sealing. Various known adhesive films can be employed as the adhesive film 600. For example, the adhesive film 600 may be a single-layer film of maleic anhydride-modified polypropylene (PPa) or a laminate film of PPa, polyethylene naphthalate (PEN), and PPa. Also, resins that can adhere to metal, such as an ionomer resin, modified polyethylene, and EVA, can also be employed instead of the PPa resin described above.

In the present embodiment, a laminate film that has a three-layer structure including a core material and is constituted by PPa/PEN (core material)/PPa is employed as the adhesive film 600. Other than PEN, various known materials can also be employed as the core material. For example, the core material may also be polyester fibers, polyamide fibers, or carbon fibers.

The adhesive film 600 adheres to the seal attachment portion 220K in a state of covering the outer peripheral surface of the seal attachment portion 220K. As described above, the adhesive film 600 also adheres to the heat-sealable resin layers 35 of the packaging materials 110 and 120, and accordingly, even if the seal attachment portion 220K is made of metal, the valve device 200K and the packaging materials 110 and 120 can be easily bonded through heat sealing. Also, even if the seal attachment portion 220K is made of resin, the adhesive film 600 securely adheres to the heat-sealable resin layers 35 of the packaging materials 110 and 120, and accordingly, the valve device 200K and the packaging materials 110 and 120 can be securely bonded through heat sealing. The adhesive film 600 more effectively functions particularly in a case where the seal attachment portion 220K is made of Teflon (registered trademark) among resins. Note that a cross section taken along line XXXI-XXXI in FIG. 30 has a teary eye shape (a shape that includes a circular portion 613 and wing-shaped extended end parts 614 and 615). That is, the entire periphery of the shape of the cross section taken along line XXXI-XXXI in FIG. 30 is curved. More specifically, the outer periphery of the circular portion 613 is outwardly curved in the cross section, and both end sides of the circular portion 613 are smoothly connected to base end sides of the wing-shaped extended end parts 614 and 615 with the outer periphery inwardly curved in the cross section, and therefore the adhesive film 600 can be bonded to the outer periphery of the seal attachment portion 220K with no gap formed therebetween.

Also, a length W1 of the adhesive film 600 in the width direction is longer than a length W2 of the seal attachment portion 220K in the width direction. That is, in the valve device 200K, the adhesive film 600 extends past the outer periphery of the seal attachment portion 220K (FIG. 31). Therefore, according to the valve device 200K, the valve device 200K and the packaging materials 110 and 120 can be more securely bonded since the adhesive film 600 is arranged over a wide range.

Also, the arrangement range of the adhesive film 600 reaches the lower end of the seal attachment portion 220K. The reason for this will be described. As described above, a secondary battery is housed in the housing body 100 to which the valve device 200K is attached. In this case, if the seal attachment portion 220K (metal) is exposed in a wide range, an electrode of the secondary battery and the seal attachment portion 220K are likely to come into contact with each other, and a short circuit is likely to occur. In the valve device 200K, the arrangement range of the adhesive film 600 reaches the lower end of the seal attachment portion 220K. Therefore, according to the valve device 200K, it is possible to reduce the possibility that the valve device 200K will cause a short circuit. Note that the adhesive film 600 may also be arranged so as to extend downward past the lower end of the seal attachment portion 220K.

8-16

In the first to seventh embodiments described above, helium leakage amounts of the valve devices (the valve devices 200 and 200A to 200J) are not particularly described. The helium leakage amount of each valve device may be as described below, for example. The following describes the helium leakage amount of the valve device 200 as a representative example of the valve devices. Note that the helium leakage amount of the valve device 200 can also be applied as helium leakage amounts in the other embodiments (the second to seventh embodiments).

As described above, the valve device 200 is configured to discharge gas from the inside to the outside of the housing body 100 if the internal pressure of the housing body 100 has reached or exceeded a predetermined value due to gas generated in the housing body 100. If sealing performance of the valve device 200 is excessively high, the valve device 200 may fail to function even if the internal pressure of the housing body 100 has reached or exceeded the predetermined value. On the other hand, if sealing performance of the valve device 200 is lower than required, it is highly likely that water vapor (moisture) will enter the housing body 100 from the external environment during a normal period (when the internal pressure of the housing body 100 is lower than the predetermined value).

In the valve device 200 according to the present embodiment, the helium leakage amount of the valve device 200 is adjusted to simultaneously realize high sealing performance of the valve device 200 and effective suppression of the intrusion of water vapor into the housing body 100.

The inventor(s) of the present invention found that if the helium leakage amount from a secondary side to a primary side of the valve device 200 measured in an environment at 25° C. in accordance with a method defined in "vacuum spraying method" of JIS Z2331:2006 "Method for helium leak testing" is from $5.0 \times 10^{-11}$ Pa·m$^3$/sec to $5 \times 10^{-6}$ Pa·m$^3$/sec inclusive, it is possible to simultaneously realize high sealing performance of the valve device 200 and effective suppression of the intrusion of water vapor into the housing body 100. Therefore, the helium leakage amount of the valve device 200 may be from b $5.0 \times 10^{-11}$ Pa·m$^3$/sec to b $5.0 \times 10^{-6}$ Pa·m$^3$/sec inclusive when measured in an environment at 25° C. using the method defined in the above-described standard. Note that the secondary side of the valve device 200 refers to the outside of the housing body 100 when the valve device 200 is attached to the housing body 100. Also, the primary side of the valve device 200 refers to the inside of the housing body 100 when the valve device 200 is attached to the housing body 100.

The upper limit of the helium leakage amount of the valve device 200 is preferably about $4.5 \times 10^{-6}$ Pa·m$^3$/sec or less, more preferably about $1.0 \times 10^{-6}$ Pa·m$^3$/sec or less, further preferably about $1.0 \times 10^{-7}$ Pa·m$^3$/sec or less, and yet more preferably about $1.0 \times 10^{-8}$ Pa·m$^3$/sec or less, for example, and the lower limit of the helium leakage amount of the valve device 200 is $5.0 \times 10^{-11}$ Pa·m$^3$/sec or more. Preferable ranges of the helium leakage amount of the valve device 200 are from $5.0 \times 10^{-11}$ Pa·m$^3$/sec to about $4.5 \times 10^{-6}$ Pa·m$^3$/sec, from $5.0 \times 10^{-11}$ Pa·m$^3$/sec to about $1.0 \times 10^{-6}$ Pa·m$^3$/sec, from $5.0 \times 10^{-11}$ Pa·m$^3$/sec to about $1.0 \times 10^{-7}$ Pa·m$^3$/sec, and from $5.0 \times 10^{-11}$ Pa·m$^3$/sec to about $1.0 \times 10^{-8}$ Pa·m$^3$/sec, for example.

If the helium leakage amount satisfies the upper limit described above, the intrusion of water vapor (moisture) from the external environment into the housing body 100 can be effectively suppressed. Also, if the helium leakage amount satisfies the lower limit described above, gas generated in the housing body 100 can be discharged to the outside. Note that if the helium leakage amount is too small, it is difficult to stably discharge gas generated in the housing body 100 to the outside of the housing body 100. Also, if a battery cell is continuously used with such a valve device being not opened for a long period, it is highly likely that the valve device will not appropriately open even if the internal pressure has increased to a design value.

Furthermore, if the helium leakage amount of the valve device 200 is set to a range from $5.0 \times 10^{-11}$ Pa·m$^3$/sec to about $2.0 \times 10^{-10}$ Pa·m$^3$/sec or from $5.0 \times 10^{-11}$ Pa·m$^3$/sec to about $1.5 \times 10^{-10}$ Pa·m$^3$/sec, the intrusion of water vapor (moisture) from the external environment into the housing body 100 can be particularly effectively suppressed. In order to set the helium leakage amount as described above, the shape of a portion in which a valve seat of the valve mechanism and the ball come into contact with each other needs to be designed and processed with very high precision that is not required in conventional check valves, as described later.

Note that the helium leak testing is carried out as follows. That is, in the helium leak testing, the helium leakage amount from the secondary side to the primary side of the valve device 200 is measured in accordance with the method defined in "vacuum spraying method" of JIS Z2331:2006 "Method for helium leak testing". Specifically, a helium leak detector is used as a test apparatus. Also, a gas valve (the valve function portion 210) of the valve device 200 is set in a leak test jig (a jig for which it was confirmed that helium does not leak when a dummy valve device including a closed gas valve was set), and the jig is set in the helium leak detector via a test port. It is confirmed that helium does not leak between the jig and the helium leak detector. Thereafter, the valve device 200 is evacuated to 13 Pa from the primary side, a 99.99% helium gas is sprayed from the secondary side of the valve device 200, and measurement is started. Evaluation results are recorded with a spraying period set to 1 to 2 seconds and a waiting period set to 2 to 4 seconds. Note that it is also possible to cover the same valve device 200 with a hood having a capacity of 50 ml and wait for 20 seconds in accordance with the method defined in "vacuum covering method (vacuum hood method)" of JIS Z2331:2006 "Method for helium leak testing" to make it sure that similar measurement results can be obtained. In any case, measurement is performed in an environment at 25° C. The lower limit of a pressure difference between the primary side and the secondary side of the valve device 200 (i.e., an opening pressure of the valve device 200) is preferably about 0.05 MPa or more, and more preferably about 0.1 MPa or more, for example. The upper limit of the pressure difference is preferably about 1 MPa or less, and more preferably about 0.3 MPa or less, for example. Preferable ranges of the pressure difference are about 0.05 to 1 MPa, about 0.05 to 0.3 MPa, about 0.1 to 1 MPa, and about 0.1 to 0.3 MPa, for example. If the pressure difference is as described above, gas generated in the housing body 100 can be appropriately discharged to the outside, and the intrusion of water vapor (moisture) from the external environment can be effectively suppressed.

The internal pressure of the battery 10 (the housing body 100) to which the valve device 200 has been attached is preferably set to be no higher than a predetermined pressure. Although the setting value of the internal pressure is appropriately determined according to the type of a package including the valve device, the setting value is preferably about 0.1 MPa or less, and more preferably about $1.0 \times 10^{-2}$ MPa or less. The lower limit of the setting value is about $1.0 \times 10^{-10}$ MPa or more, for example. Preferable ranges of the internal pressure are about $1.0 \times 10^{-10}$ to 0.1 MPa and about $1.0 \times 10^{-10}$ to $1.0 \times 10^{-2}$ MPa, for example.

The helium leakage amount of the valve device 200 can be set using a known method. For example, the helium leakage amount can be adjusted by designing materials, shapes, and sizes of members (e.g., the ball 214, the o ring 212, the spring 216, and the exhaust port O1) constituting the valve function portion 210 of the valve device 200 and a force with which the ball 214 is pressed by the spring 216.

For example, if an elastic body is used as one of the ball 214 and the O ring 212 of the valve mechanism and a member that has a high degree of hardness, such as metal, is used as the other, the helium leakage amount can be easily set to the range from $5.0 \times 10^{-11}$ Pa·m$^3$/sec to $5.0 \times 10^{-6}$ Pa·m$^3$/sec inclusive. In order to reduce the helium leakage amount, it is effective to use elastic bodies for both of the ball 214 and the O ring 212 of the valve mechanism, but if the helium leakage amount is too small, it is difficult to appropriately discharge gas generated in the housing body 100 to the outside as described above, and therefore, materials, shapes, sizes, and the like of the members constituting the valve mechanism are appropriately adjusted. For example, if a portion of the O ring 212 that comes into contact with the ball 214 in the valve mechanism has a shape that conforms to the shape of the surface of the ball 214, the helium leakage amount can be easily designed to fall within the above-described ranges.

That is, in order to set the helium leakage amount of the valve device 200 to the range from $5.0 \times 10^{-11}$ Pa·m³/sec to about $2.0 \times 10^{-10}$ Pa·m³/sec or from $5.0 \times 10^{-11}$ Pa·m³/sec to about $1.5 \times 10^{-10}$ Pa·m³/sec, the shape of the portion in which the O ring 212 and the ball 214 of the valve mechanism come into contact with each other needs to be designed and processed with very high precision that is not required in conventional check valves. For example, it is effective to make the ball 214 and a portion of the O ring 212 that comes into contact with the ball 214 have an average surface roughness of 20 μm or less, preferably 5 μm or less, and more preferably 1 μm or less. However, there is a problem in that the valve device 200 may fail to appropriately operate (the valve function portion 210 may fail to open) if members that are too precise are brought into contact with each other, and therefore the surface roughness needs to be adjusted such that the helium leakage amount falls within the above-described ranges.

8-17

In the first to seventh embodiments described above, a maximum distortion in the thickness direction of the housing body 100 after gas is discharged from the inside to the outside of the housing body 100 via the valve device (which hereinafter will also be simply referred to as the "maximum distortion") is not particularly described. The maximum distortion in the thickness direction of the housing body 100 may be as described below, for example. The following describes, as a representative example, the maximum distortion of the housing body 100 in the first embodiment described above. Note that the maximum distortion of the housing body 100 in the first embodiment can also be applied as the maximum distortion of the housing body 100 in the other embodiments (the second to seventh embodiments).

The battery 10 includes the housing body 100 and the valve device 200. The housing body 100 is constituted by at least one laminate including at least the base material layer, the barrier layer, and the heat-sealable resin layer that are layered in that order. The housing body 100 houses the battery element 400. The valve device 200 is in communication with the inside of the housing body 100. The valve device 200 is configured to reduce the internal pressure of the housing body 100 if the internal pressure is increased due to gas generated in the housing body 100. The maximum distortion of the thickness of the housing body 100 (the packaging materials 110 and 120) after gas is discharged from the inside to the outside of the housing body 100 via the valve device 200 may be less than 30%. That is, the opening pressure of the valve device 200 of the battery 10 may be set such that the maximum distortion of the thickness is less than 30%.

As a result of the battery 10 having such a feature, gas is discharged via the valve device 200 at appropriate timings, and therefore it is possible to suppress the occurrence of problems such as the formation of large creases in the housing body 100 after gas is discharged and large deformation of the housing body 100 after gas is discharged.

As described above, focusing on the relationship between the maximum distortion of the housing body 100 and the opening pressure of the valve device 200, the maximum distortion of the housing body 100 of the battery 10 can be set to be less than 30%. As a result, in the battery 10, gas can be discharged via the valve device 200 to the outside of the housing body 100 at appropriate timings before problems occur such as the formation of large creases in the housing body 100 after gas is discharged and large deformation of the housing body 100 after gas is discharged. That is, when the internal pressure of the housing body 100 is increased, if a change in the thickness of the housing body 100 is observed and the opening pressure of the valve device 200 is set such that the valve device 200 will open before the thickness is reduced by 30%, it is possible to effectively suppress problems such as the formation of large creases in the housing body 100 after the valve device 200 is open and large deformation of the housing body 100 after the valve device 200 is open.

The upper limit of the maximum distortion is preferably about 28% or less, and more preferably 27% or less, for example. Also, the lower limit of the maximum distortion is preferably about 2% or more, and more preferably about 4% or more, for example. If the maximum distortion is set as described above, gas can be discharged to the outside of the housing body 100 at more appropriate timings before problems occur such as the formation of large creases in the housing body 100 after gas is discharged and large deformation of the housing body 100 after gas is discharged. Preferable ranges of the maximum distortion are about 2% or more and less than 30%, and from about 4% to about 28%, for example.

The maximum distortion of the housing body 100 is measured as described below. First, the same two housing bodies 100 are prepared as targets of measurement of the maximum distortion. Next, lines are drawn in a lattice pattern at intervals of 1 mm on outer surfaces of the housing bodies 100. At this time, the lines are drawn at the same positions on the respective outer surfaces of the two housing bodies 100. Next, with respect to one of the housing bodies 100, the valve device 200 is sealed and another air passage is provided in the housing body 100, or the valve function is removed from the valve device 200 so that the valve device 200 functions as the air passage, and air is introduced via the air passage to the inside of the housing body 100 to increase the internal pressure up to 1 MPa and cause the housing body 100 to swell. Next, air is removed via the air passage to reduce the internal pressure to normal pressure, the housing body 100 is cut along a line of the above-described lattice pattern, and the thickness of the cross section is measured. The housing body 100 into which air has not been introduced is also cut along a line of the above-described lattice pattern, and the thickness of the cross section is measured. Next, a position at which the thickness decreased the most when compared to the thickness at the same position of the housing body 100 to which air has not been introduced is taken to be a position with the maximum distortion, and the ratio (%) of reduction in the thickness at the position with the maximum distortion is taken to be the maximum distortion (%). For example, if the housing body 100 of which the internal pressure has not been increased has a thickness of 100 μm at the position with the maximum distortion and the housing body 100 of which the internal pressure has been increased has a thickness of 70 μm at the same position, the maximum distortion is 30%.

LIST OF REFERENCE NUMERALS

10 Battery
31 Base material layer
32 Adhesive agent layer
33 Barrier layer
34 Adhesive layer
35 Heat-sealable resin layer
40, 401, 41, 411 Wing-shaped extended end part
50, 51 Pillar
60 Linear protrusion
100 Housing body
110, 110K, 120 Packaging material
112 Molded part
114, 114K Flange portion
116K Valve device arrangement portion
130 Joined edge portion
200, 200A, 200B, 200C, 200D, 200E, 200F, 200G, 200H, 200I, 200J, 200K Valve device
210, 210A, 210B, 210C, 210E, 210F, 210G, 210H, 210I, 210J, 210K Valve function portion
212 O ring
214 Ball
216 Spring
218 Membrane
220, 220A, 220B, 220C, 220D, 220E, 220F, 220G, 220H, 220I, 220J, 220K Seal attachment portion
300 Tab
310 Tab film
400 Battery element
600 Adhesive film
613 Circular portion
614, 615 Wing-shaped extended end part
A1, A2, A3, A4, A5, A6 Air passage
C1 Center line
O1 Exhaust port

The invention claimed is:

1. A battery comprising:
a battery element;
a housing body that is constituted by at least one laminate including at least a base material layer, a barrier layer, and a heat-sealable resin layer layered in that order and houses the battery element; and
a valve device that is in communication with the inside of the housing body,
wherein sections of the heat-sealable resin layer of the at least one laminate face each other in a peripheral edge portion of the housing body,
a joined edge portion in which the mutually facing sections of the heat-sealable resin layer of the at least one laminate are fused together is formed in the peripheral edge portion of the housing body,
the valve device includes:
a first portion in which a valve mechanism is formed, the valve mechanism being configured to reduce an internal pressure of the housing body if the internal pressure is increased due to gas generated in the housing body; and
a second portion in which an air passage is formed, the air passage being configured to guide gas generated in the housing body toward the valve mechanism,
the first portion is located on an outer side of an outer edge of the joined edge portion,
at least a portion of the second portion is sandwiched between the sections of the heat-sealable resin layer of the at least one laminate in the joined edge portion,
a length of the second portion in a width direction of the battery is longer than a length of the second portion in a thickness direction of the battery, and
wherein a length of the air passage of the second portion in a width direction of the battery is longer than a length of the air passage of the second portion in a thickness direction of the battery, where the width direction is transverse to a longitudinal axis of the second portion.

2. A battery comprising:
a battery element;
a housing body that is constituted by at least one laminate including at least a base material layer, a barrier layer, and a heat-sealable resin layer layered in that order and houses the battery element; and
a valve device that is in communication with the inside of the housing body,
wherein sections of the heat-sealable resin layer of the at least one laminate face each other in a peripheral edge portion of the housing body,
a joined edge portion in which the mutually facing sections of the heat-sealable resin layer of the at least one laminate are fused together is formed in the peripheral edge portion of the housing body,
the valve device includes:
a first portion in which a valve mechanism is formed, the valve mechanism being configured to reduce an internal pressure of the housing body if the internal pressure is increased due to gas generated in the housing body; and
a second portion in which an air passage is formed, the air passage being configured to guide gas generated in the housing body toward the valve mechanism,
the first portion is located on an outer side of an outer edge of the joined edge portion,
at least a portion of the second portion is sandwiched between the sections of the heat-sealable resin layer of the at least one laminate in the joined edge portion,
a length of the second portion in a width direction of the battery is longer than a length of the second portion in a thickness direction of the battery,
an outer contour of the joined edge portion by the heat-sealable resin layers at a peripheral joint in contact with a portion of the second portion includes a straight line, and
wherein a length of the air passage of the second portion in a width direction of the battery is longer than a length of the air passage of the second portion in a thickness direction of the battery, where the width direction is transverse to a longitudinal axis of the second portion.

* * * * *